United States Patent [19]

Vanhoof et al.

[11] 3,923,813

[45] Dec. 2, 1975

[54] DERIVATIVES OF 2-AMINOINDANES

[75] Inventors: Pierre M. Vanhoof; Pierre M. Clarebout, both of Brussels, Belgium

[73] Assignee: A. Christiaens Societe Anonyme, Brussels, Belgium

[22] Filed: Mar. 8, 1973

[21] Appl. No.: 339,454

Related U.S. Application Data

[63] Continuation-in-part of Ser. No. 99,643, Dec. 12, 1970, abandoned.

[30] Foreign Application Priority Data

Dec. 19, 1969 United Kingdom............... 6200/69

[52] U.S. Cl.................260/293.62; 260/247.2 A; 260/247.5 B; 260/268 BC; 260/295 F; 260/295 K; 260/296 B; 260/326.33; 260/326.85; 260/561 A; 260/570.5 P; 424/248; 424/250; 424/267; 424/274; 424/320; 424/330

[51] Int. Cl.²...................................... C07D 295/14

[58] Field of Search ............ 260/247.2 A, 247.5 B, 268 BC, 260/293.62, 295 F, 295 K, 296 B, 326.33, 326.85, 561 A, 570.5 P

[56] References Cited

UNITED STATES PATENTS

| | | | |
|---|---|---|---|
| 2,505,133 | 4/1950 | Miescher et al. | 260/309.6 |
| 2,670,371 | 2/1954 | Cusic | 260/570.5 |
| 2,670,376 | 2/1954 | Scudi et al. | 260/570.5 |
| 2,687,414 | 8/1954 | Cusic | 260/570.5 |

FOREIGN PATENTS OR APPLICATIONS 106,506   2/1963   Czechoslovakia......... 260/570.5 PA

*Primary Examiner*—G. Thomas Todd
*Attorney, Agent, or Firm*—Sughrue, Rothwell, Mion, Zinn & Macpeak

[57] ABSTRACT

This invention relates to new derivatives of 2-aminoindane, namely N-phenyl (or 2-pyridyl)-N-di-$R_1,R_2$-aminoalkyl (or aminoalkanoyl)-2-aminoindanes wherein $R_1$ is hydrogen or a lower alkyl, hydroxyalkyl, alkenyl or alkynyl radical, $R_2$ is a lower alkyl, hydroxyalkyl, alkenyl or alkynyl radical, whereby $R_1$ and $R_2$ may form together with the attached nitrogen atom a nitrogenous heterocyclic ring, as well as the acid addition salts of said derivatives.

The new compounds are valuable therapeutic agents for the treatment of heart arrhythmy.

12 Claims, No Drawings

DERIVATIVES OF 2-AMINOINDANES

REFERENCE TO CROSS-RELATED APPLICATIONS

This application is a continuation-in-part application of our earlier co-pending application, Ser. No. 99,643, filed on Dec. 12, 1970, now abandoned and claims priority from Dec. 19, 1969 based on British Provisional Patent Application 62073/69; Nov. 26, 1970 based on the Complete Specification of British Provisional Pat. Application 62073/69; Feb. 5, 1973 based on British Provisional Pat. Application 5631/73; Mar. 1, 1973 based on British Provisional Pat. Application 9988/73; Mar. 1, 1973 based on British Provisional Pat. Application 9987/73; Mar. 2, 1973 based on British Provisional Pat. Application 10302/73; Mar. 2, 1973 based on British Provisional Pat. Application 10303/73; Mar. 2, 1973 based on British Provisional Pat. Application 10305/73; and Mar. 2, 1973 based on British Provisional Pat. Application 10304/73, respectively.

SUMMARY OF THE INVENTION

This invention relates to new nitrogenous organic compounds and to pharmaceutical compositions containing said compound as active ingredients.

The new nitrogenous organic compounds according to this invention are derivatives of 2-aminoindane of the general formula:

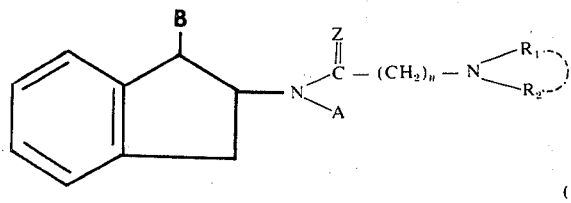

(I)

wherein $n$ is equal to 1,2 or 3, Z represents two hydrogen atoms or an oxygen atom, the $(CH_2)_n$ group having a straight or branched claim, $R_1$ represents hydrogen, a lower alkyl or hydroxylakyl radical containing 1 to 3 carbon atoms or a lower alkenyl or alkynyl radical containing 2 or 3 carbon atoms, $R_2$ represents a lower alkyl or hydroxyalkyl radical containing 1 to 3 carbon atoms or a lower alkenyl or alkynyl radical containing 2 or 3 carbon atoms, whereby $R_1$ and $R_2$ may be identical or different and may also form together with the adjacent nitrogen atom a nitrogenous heterocyclic ring, A is a 2-pyridyl radical, an unsubstituted phenyl radical or a phenyl radical substituted by at least one substituent in the ortho, meta and/or para position, and B represents hydrogen, an alkoxy radical containing 1 to 3 carbon atoms or a group of the formula

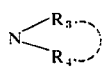

in which $R_3$ and $R_4$ which may be identical or different represent a lower alkyl or hydroxyalkyl radical containing 1 to 3 carbon atoms, whereby $R_3$ may also represent hydrogen, whereas $R_3$ and $R_4$ may also form with the attached nitrogen atom a nitrogenous heterocyclic ring, as well as the acid addition salts of said derivatives of formula (I).

This invention relates also to pharmaceutical compositions namely for the treatment of heart arrhythmy containing at least one compound of the general formula (I), together with a pharmaceutically acceptable excipient or carrier.

DETAILED DESCRIPTION OF THE INVENTION

It has surprisingly been found that the compounds of the general formula I are very active for the treatment of heart arrhythmia.

Said compounds can be used for the treatment of various heart diseases such as premature heart contractions, ventricular and surpraventricular tachycardias either idiopathic or subsequent to cardiopathia or to coronary disease, cardiac arrhythmias due to digitalin intoxication, as well as atrial fibrillation and flutter, particularly in the early stage.

It is known (see Koch-Weser, J. Arch. Int. Med. 129; 763, 1972) that none of the presently available antiarrhythmic agents are satisfactory for the prophylaxis of tachycardias and filbrillation of ventricular origin.

The oral activity of the known antiarrhythmic agents, such as procainamide or lidocaine, is either too short leading to multiple day and night administration (for example with procainamide) or too low to be of some practical utility (for example with lidocaine) or their therapeutic activity is conjugated with frequent and dangerous side effects, such as hypotension (with procainamide), sudden death, agranulocytosis or idiosynerasy.

The compounds of general formula I according to this invention are very active when orally administered, although they may also be administered parenterally. They have also a long activity duration and are not depressant for the myocardial function.

Applicants do not know any orally active antiarrhythmic agent which does not act at the same time as a depressant of the myocardial function.

The oral antiarrhythmic activity of the compounds of formula I has been proved by tests on rats using aconitine which is a compound causing premature heart contractions and death of the animals.

The method used for these tests is described hereafter:

Animals:

Male or female rats with a body-weight ranging from 380 to 450 g.

Aconitine solution:

312 μg aconitine nitrate/1 ml physiological saline.

Solution of the compound to be tested:

0.75 % in distilled water.

Method:

Six random selected animals are required for each compound to be tested. The compound is administered by oral route at the dose of 75 mg/kg (1ml of the 0.75 % solution/100 g of body-weight) 75 minutes before the intravenous perfusion of the aconitine solution is initiated.

Control groups of animals are treated only with distilled water (1 ml/100 g).

Sixty minutes after the administration of the compound to be tested, the animals are anesthesized by an intraperitoneal injection of Pentobarbital (50 mg/kg) and the jugular vein is dissected. A catheter is introduced in the vein and fixed by a ligature The ECG (D II derivation) is then continuously recorded. The perfusion of the aconitine solution is started 75 minutes after the administration of the compound to be tested. The volume delivered by the injection device being 0.287 ml/minute, the dose of aconitine nitrate administered is 0.895 μg/minute (0.20 - 0.24 μg/100 g/min. according to the minimal and maximal weight of the animals). The experience is stopped as soon as the first extrasystoles are appearing and the time elapsed from the beginning of the perfusion is noted.

of the antiarrhythmic activity by oral route of a great number of acid addition salts of compounds of formula I, compared to the activity of two well known antiarrhythmic agents (procainamide and lidocaine):

The results are expressed as the mean total dose of aconitine injected in a group of animals.

The relative activity between a tested compound and a reference substance (lidocaine, procainamide) is computed in the following way:

$$A(x) = \frac{\overline{X} - \overline{C}}{\overline{R} - \overline{C}} \times 100$$

where $A(x)$ = activity of tested compound X (in %)
$\overline{X}$ = mean dose of aconitine in the animals treated by compound X
$\overline{C}$ = Mean dose of aconitine injected in the untreated animals (controls)
$\overline{R}$ = Mean dose of aconitine injected in the animals treated by the reference substances.

The following table gives the results of the evaluation

TABLE 1

| Compounds of formula I | | | | | | type of salt | % activity versus | |
|---|---|---|---|---|---|---|---|---|
| A | B | n | Z | $R_1$ | $R_2$ | | Lidocaine | Procainamide |
| phenyl | H | 2 | $H_2$ | $C_2H_5$ | $C_2H_5$ | monohydrochloride | 683 | 871 |
| phenyl | H | 2 | $H_2$ | $CH_3$ | $CH_3$ | monohydrochloride | 299 | 382 |
| phenyl | H | 2 | $H_2$ | $C_3H_7$ | $C_3H_7$ | dihydrochloride | 400 | 510 |
| phenyl | H | 3 | $H_2$ | $C_2H_5$ | $C_2H_5$ | monohydrochloride | 653 | 833 |
| 2-pyridyl | H | 2 | $H_2$ | $C_2H_5$ | $C_2H_5$ | monohydrochloride | 1283 | 1644 |
| phenyl | H | 2 | $H_2$ | $CH_2-CH=CH_2$ | $CH_2-CH=CH_2$ | monohydrochloride | 404 | 516 |
| phenyl | H | 1 | $H_2$ | $CH_3$ | $CH_3$ | monohydrochloride | 189 | 242 |
| phenyl | H | 1 | $H_2$ | $C_2H_5$ | $C_2H_5$ | monohydrochloride | 261 | 332 |
| phenyl | H | 1 | $H_2$ | morpholino | | monohydrochloride | 77 | 99 |
| phenyl | H | 2 | $H_2$ | methylpiperazino | | monohydrochloride | 285 | 365 |
| phenyl | H | 2 | $H_2$ | $CH_3$ | $C_2H_5$ | monohydrochloride | 1041 | 1330 |
| phenyl | H | 2 | $H_2$ | $C_2H_5$ | $C_3H_7$ | monohydrochloride | — | — |
| phenyl | H | 2 | $H_2$ | $C_2H_5$ | $CH_2CH_2OH$ | monohydrochloride | 322 | 411 |
| phenyl | H | 3 | $H_2$ | piperidino | | monohydrochloride | 505 | 645 |
| 2-6 chlorophenyl | H | 2 | $H_2$ | $C_2H_5$ | $C_2H_5$ | monohydrochloride | 118 | 152 |
| 2-chlorophenyl | H | 2 | $H_2$ | $C_2H_5$ | $C_2H_5$ | fumarate | 402 | 513 |
| 3-chlorophenyl | H | 2 | $H_2$ | $C_2H_5$ | $C_2H_5$ | oxalate | 324 | 414 |
| 4-chlo- | H | 2 | $H_2$ | $C_2H_5$ | $C_2H_5$ | fumarate | 179 | 228 |

TABLE 1-continued

| \multicolumn{6}{c|}{Compounds of formula I} | type of salt | \multicolumn{2}{c}{% activity versus} |
| A | B | n | Z | R₁ | R₂ | | Lidocaine | Procainamide |
|---|---|---|---|---|---|---|---|---|
| rophenyl | | | | | | | | |
| 2-methylphenyl | H | 2 | H₂ | C₂H₅ | C₂H₅ | fumarate | 209 | 266 |
| 3-trifluoromethyl phenyl | H | 2 | H₂ | C₂H₅ | C₂H₅ | fumarate | 179 | 228 |
| 4-methoxyphenyl | H | 2 | H₂ | C₂H₅ | C₂H₅ | oxalate | 462 | 590 |
| 2-methylphenyl | H | 2 | H₂ | C₂H₅ | C₂H₅ | oxalate | 361 | 460 |
| 4-hydroxyphenyl | H | 2 | H₂ | C₂H₅ | C₂H₅ | dihydrochloride | 235 | 300 |
| phenyl | H | 2 | H₂ | H | CH₃ | monohydrochloride | 868 | 1108 |
| phenyl | H | 1 | H₂ | H | C₂H₅ | monohydrochloride | 335 | 428 |
| phenyl | H | 2 | H₂ | H | C₂H₅ | monohydrochloride | 1114 | 1422 |
| phenyl | H | 2 | H₂ | H | C₃H₇ | monohydrochloride | 942 | 1202 |
| phenyl | H | 2 | H₂ | H | tert. C₄H₉ | monohydrochloride | 628 | 801 |
| phenyl | H | 2 | H₂ | H | CH₂CH₂OH | monohydrochloride | 416 | 531 |
| phenyl | H | 2 | H₂ | H | CH₂—CH=CH₂ | monohydrochloride | 811 | 1035 |
| phenyl | H | 2 | H₂ | H | CH₂—C≡CH | oxalate | 213 | 272 |
| phenyl | H | 3 | H₂ | H | CH₂—CH=CH₂ | monohydrochloride | 335 | 428 |
| phenyl | H | 3 CH₃ | H₂ | H | C₂H₅ | monohydrochloride | 369 | 471 |
| phenyl | H | 3(-CH-CH₂) | H₂ | H | C₂H₅ | monohydrochloride | 152 | 194 |
| phenyl | H | 2(—CH—) ( \| CH₃ ) | H₂ | C₂H₅ | C₂H₅ | monohydrochloride | 358 | 457 |
| phenyl | OC₂H₅ | 1 | H₂ | C₂H₅ | C₂H₅ | monohydrochloride | 390 | 497 |
| phenyl | OC₂H₅ | 1 | H₂ | H | C₂H₅ | monohydrochloride | 759 | 968 |
| phenyl | OC₂H₅ | 2 | H₂ | C₂H₅ | C₂H₅ | monohydrochloride | 919 | 1173 |
| phenyl | OC₂H₅ | 2 | H₂ | H | C₂H₅ | monohydrochloride | 599 | 765 |
| phenyl | OCH₃ | 2 | H₂ | CH₃ | C₂H₅ | monohydrochloride | — | — |
| phenyl | OCH₃ | 2 | H₂ | \multicolumn{2}{c|}{piperidino} | monohydrochloride | 1058 | 1350 |
| phenyl | OCH₃ | 2 | H₂ | \multicolumn{2}{c|}{methylpiperazino} | trihydrochloride | 420 | 536 |
| phenyl | OCH₃ | 2 | H₂ | H | CH₃ | monohydrochloride | 836 | 1067 |
| phenyl | OCH₃ | 2 | H₂ | H | C₂H₅ | monohydrochloride | 880 | 1124 |
| phenyl | OCH₃ | 1 | H₂ | \multicolumn{2}{c|}{pyridino} | fumarate | 334 | 426 |
| phenyl | OCH₃ | 1 | H₂ | C₂H₅ | C₂H₅ | monohydrochloride | 708 | 904 |
| phenyl | OCH₃ | 2 | H₂ | CH₃ | CH₃ | fumara- | 755 | 963 |

TABLE 1-continued

| A | B | n | Z | R₁ | R₂ | type of salt | % activity versus Lidocaine | % activity versus Procainamide |
|---|---|---|---|---|---|---|---|---|
| phenyl | OCH₃ | 2 | H₂ | C₂H₅ | C₂H₅ | fumarate | 981 | 1251 |
| phenyl | N(C₂H₅)(C₂H₅) | 2 | H₂ | CH₃ | CH₃ | dihydrochloride | 247 | 316 |
| phenyl | N(C₂H₅)(C₂H₅) | 2 | H₂ | C₂H₅ | C₂H₅ | dihydrochloride | 416 | 531 |
| phenyl | N(OCH₃)(CH₃) | 2 | H₂ | CH₃ | CH₃ | difumarate | 238 | 303 |
| phenyl | H | 1 | O | C₂H₅ | C₂H₅ | monohydrochloride | 367 | 468 |
| phenyl | H | 1 | O | CH₃ | CH₃ | monohydrochloride | 158 | 202 |
| phenyl | H | 2 | O | CH₃ | CH₃ | monohydrochloride | 531 | 677 |
| phenyl | H | 2 | O | C₂H₅ | C₂H₅ | monohydrochloride | 1034 | 1319 |
| phenyl | OCH₃ | 1 | O | C₂H₅ | C₂H₅ | monohydrochloride | 558 | 713* |
| phenyl | H | 2 | O | H | C₂H₅ | monohydrochloride | 733 | 936 |
| phenyl | H | 1 | O | methylpiperazino | | monohydrochloride | 332 | 423 |
| phenyl | H | 2 | O | piperidino | | monohydrochloride | 656 | 837 |
| phenyl | H | 2 | O | methylpiperazino | | monohydrochloride | 544 | 694 |
| phenyl | OCH₃ | 2 | O | piperidino | | monohydrochloride | 1578 | 2013 |
| phenyl | OCH₃ | 1 | O | piperidino | | monohydrochloride | 284 | 363* |
| phenyl | H | 1 | H₂ | piperidino | | monohydrochloride | 402 | 538 |
| 2-pyridyl | H | 2 | H₂ | CH₃ | CH₃ | monohydrochloride | 1276 | 1628 |
| 2-pyridyl | H | 1 | H₂ | C₂H₅ | C₂H₅ | oxalate | 1078 | 1376 |
| 2-pyridyl | H | 1 | H₂ | piperidino | | monohydrochloride | 784 | 1000 |
| 2-pyridyl | H | 2 | H₂ | H | C₂H₅ | monohydrochloride | 1320 | 1780 |

*The compounds in question have been administered at a dose of 37.5 mg/kg.

The anti-arrhythmic activity of the compounds of formule I has been confirmed by various other tests, namely the extrasystolic arrhythmia induced in the dog by administration of a subtoxic dose of ouabain, the experimental myocardic infraction in the dog and the electrically induced ventricular fibrillation in the dog.

Clinical investigations have confirmed the potent antiarrhythmic effects of the compounds of formula (I). Up to now, more than 600 patients have been successfully treated with various compounds according to this invention.

The compounds of the formula I may be administered orally or parenterally.

Oral preparations may be administered under the form of capsules, tablets, pills and the like. Each capsule, tablet or pill may contain from 10 to 200 mg of a compound of formula I as active ingredient, together with pharmaceutically acceptable excipients or carriers.

Parenteral preparations may consist in a solution for perfusion or for intravenous or intramuscular injection. Such a solution may contain from 0.2 per thousand to 2 per thousand of a compound of formula I.

The parenteral preparation may be either a solution which may be directly used for the perfusion and contains a propoprtion of the active ingredient within the above limits, or a concentrated solution containing 1 to 10% of the active ingredient, said concentrated solution being diluted when administered to the patient.

The initial dose of active ingredient may be of 200 to 800 mg per day during 2 or 3 days, the maintenance dose being of about 25 mg to 300 mg per day.

If a single dose is sufficient for obtaining the therapeutic effect, this dose is generally comprised between 50 and 300 mg.

The active ingredient may be administered at the same time by the parenteral route (for example by perfusion) and by the oral route.

The compounds of the general formula (I) may be prepared by various processes.

First process.

This process involves the reaction of a N-phenyl [or N-(2-pyridyl]-2-aminoindane of the formula

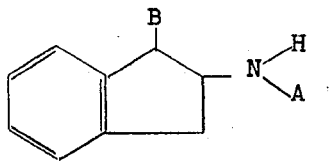

in which A and B have the above meanings with sodium amide (NaNH₂) and with a halogenated amine of the formula

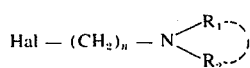

in which Hal represents a halogen atom, preferably a chlorine atom, whereas $n$, $R_1$ and $R_2$ have the above meanings.

Second process

This process involves the acylation of compound of formula (II) with an acid chloride of the formula:

$$Cl(CH_2)_{n'} \quad COCl \quad (IV)$$

in which $n' = 1, 2$ or $3$, so as to obtain an acylated compound of the formula:

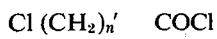

the subsequent reduction of the acylated compound of formula (V) by means of aluminum lithium hydride into a compound of the following formula:

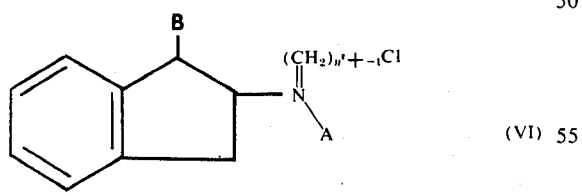

in which $n'$ has the above meanings, the obtained compound of formula (VI) being finally alkylated by means of a primary or secondary amine of the formula:

Third process:

This process involves the acylation of a compound of formula (II) with an acid chloride of the formula:

$$Cl(CH_2)_{n'} \quad COCl \quad (IV)$$

in which $n' = 1, 2$ or $3$, so as to obtain an acylated compound of the formula:

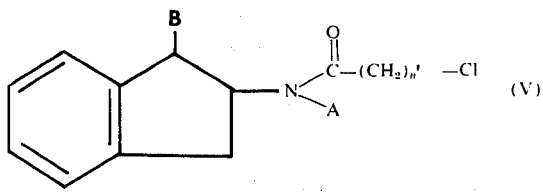

the subsequent N-alkylation of the acylated compound of formula (V) with a primary or secundary amine of the formula:

so as to obtain a compound of the formula:

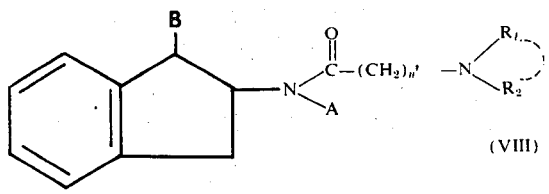

the latter compound being finally reduced into a compound of formula (I) by means of aluminum lithium hydride.

Fourth process

This process involves the N-alkylation of a N-substituted aniline monohydrochloride of the formula:

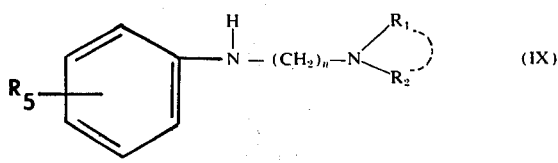

in which $R_5$ is a substituent, whereas $n$, $R_1$ and $R_2$ have the above meanings, by means of indanol mesylate of the formula:

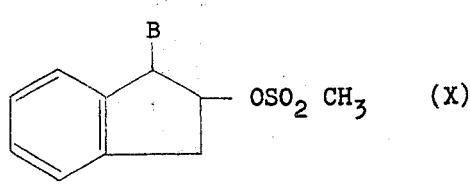

Fifth process:

This process involves the reaction of a N-phenyl(or 2-pyridyl)-2-aminoindane of the formula (II)

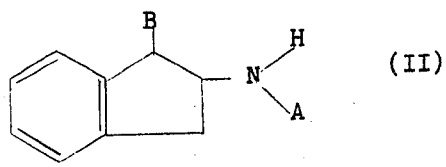

in which A and B have the above meanings with a bromochloroalkane of the formula Br (CH₂)ₙ Cl in which n = 2,3 or 4, so as to obtain an intermediate compound of the formula:

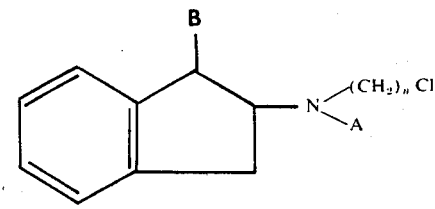

which is then reacted, without isolation, with an amine of the formula (XII)

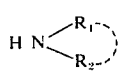

The compounds of formula (II) used as starting materials in the above described processes may be prepared by various methods First method This method involves the two following steps: 1° reaction of 2-ceto-3-cyanoindane of the formula

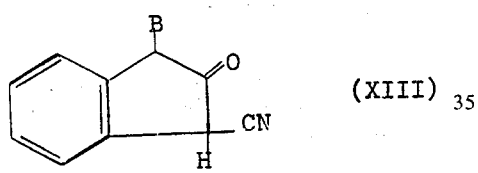

with aniline, a substituted aniline or 2-aminopyridine (as described in J.C.S. 1961, page 178) so as to obtain a 2-phenyl (or pyridyl) amino-3-cyanoindene of the formula:

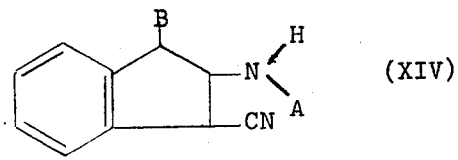

2° reduction of the 2-phenyl (or-2-pyridyl) amino-2-cyanoindene (XIV) into the compound of formula II by the Bouveault-Blanc method Second method This method involves the reaction of the ester of methane sulfonic acid and the 2-indanol of the following formula:

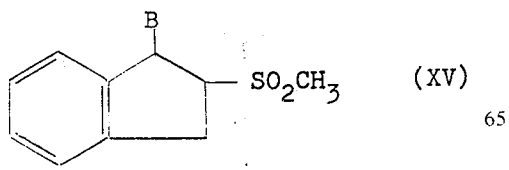

with aniline, a substituted aniline or 2-pyridine.

Third method

This method which can be used when B represents hydrogen in formula I, comprises the two following steps 1. reaction of 2-indanone of the following formula

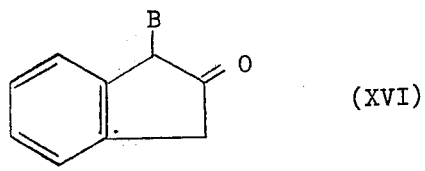

with aniline, a substituted aniline or 2-pyridine so as to obtain a N-phenyl (or 2-pyridyl)-2-iminoindane of the following formula:

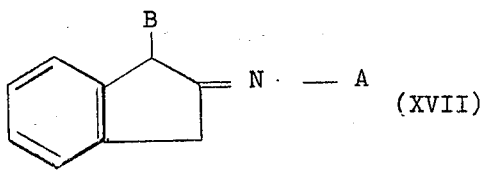

2. reduction of the N-phenyl (or-2-pyridyl)-2-iminoindane by means of sodium borohydride.

Fourth method

When B represents a

radical in the compounds of formula (I) the compounds of formula (II) wherein B represents such a

radical may be obtained by the follow method 1. reaction of an indanol of the formula:

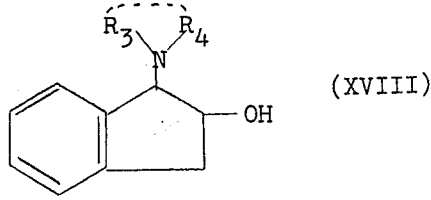

with thionyl chloride, so as to obtain a compound of the formula

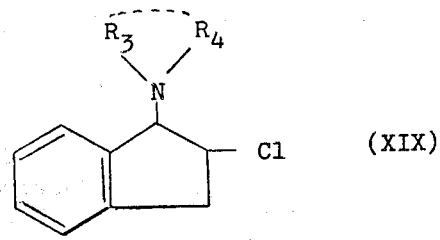

2. reaction of the compound of formula (XV) with aniline, a substituted aniline or 2-pyridine In the various formulae II to XIX, the substituents have the above meanings.

EXAMPLE 1.

Preparation of N-phenyl-N-diethylaminopropyl-2-aminoindane and the mono-and di-hydrochlorides thereof.

(formula I; A = phenyl; $R_1=R_2=C_2H_5$; $n = 2$; $Z = H_2$; $B = H$)

A Preparation of N-phenyl-2-aminoindane (II)

a. from 2-keto-3-cyanoindene (XIII)

A mixture of 0.3 mole of 2-keto-2 cyanoindene (XIII) and 0.3 mole of aniline is heated at about 95°C. A solution is gradually obtained, whereafter the crude formed 2-phenylamino-3-cyanoindene(XIV) precipitates. The mixture is then cooled and recrystallized from benzene.

Analysis: Calculated: C: 82.73%; H: 5.2%; N: 12.06%. Found: C: 82.4%; H: 5.4%; N: 11.88%.

The obtained 2-phenylamino-3-cyanoindene(XIV) is converted into N-phenyl-2-aminoindane (II) by Bouveault- Blanc method.

1 part by weight of 2-phenylamino-3-cyanoindene is placed in a reaction vessel containing 50 equivalents of ethanol. The mixture is boiled and, at the boiling temperature, 12 parts by weight of sodium are added as quickly as possible.

When the added sodium has disappeared, the mixture is poured onto 500 g of ice. The alcohol is then evaporated as quickly as posssible and the aqueous phase is extracted with chloroform. The chloroform extract is dried on sodium carbonate, the solvent is removed and the residue is distilled. The oil distilling at 111°C under 0.05 mm of Hg and at 139°-142°C under 0.05 mm of Hg is collected.

The collected oil is recrystallized from petroleum ether (B.P.:30°-32°C) - Yield : 60%.

Analysis: Calculated: C: 86.08%; H: 7.2%; N: 6.69%. Found: C: 86.3%; H: 7.3M; N: 6.4%.

Melting point of the hydrochloride of N-phenyl-2-aminoindane: 175°-180°C.

b. from 2-indanyl methane sulfonate (XV)

35 grams of 2-indanylmethanesulfonate (XV) and 70cm³ of aniline are heated at 100°C while stirring. The reaction mixture is then cooled in order to maintain the temperature at 100°C during about 25 minutes. At this time, the temperature drops and the mixture is again heated at 100°C.

During the reaction, the pinkish solution thickens and becomes solid. The stirring is then stopped and the product is heated at 140°C during 2 minutes. A semi-solid product is obtained after cooling to room temperature. This product is extracted with 100 cm³ of anhydrous ether and the aniline methane sulfonate (by-product) is filtered off. The ether is then evaporated and the residue distilled.

Yield: 28.6 grams or 83%.

c. from 2-indanone (XVI)

13.2 grams of 2-indanone (XVI) and 3.3 grams of aniline (V) are refluxed under nitrogen within 100 ml of methanol. A precipitate of N-phenyl-2-iminoindane (XVII) appears after about 30 minutes.

To the reaction mixture 4.8 grams of sodium borohydride ($NaBH_4$) are added and the mixture is maintained under reflux during 1 hour. During that time, the precipitate becomes progressively dissolved. The obtained solution is then evaporated to dryness. An aqueous solution containing 50 percent of hydrochloric acid is added to the residue. The obtained hydrochloride is filtered, dried, rinsed with acetone and recrystallized with a mixture of methanol and acetone.

B. Preparation of N-phenyl-N-diethyaminopropyl-2-aminoindane and the mono-and di-hydrochlorides thereof.

104.6 grams (0.5 mole) of N-phenyl-2-aminoindane and 2.5 litres of benzene are introduced into a reaction vessel of 5 litres, under an atmosphere of nitrogen.

37 grams (0.95 mole) of sodium amide are added and the mixture is stirred during 3 hours at room temperature.

119.7 grams (0.8 mole) of γ-chloropropyl diethylamine are then quickly added. After agitation during 1 hour at room temperature, the reaction mixture is refluxed and stirred under nitrogen during 21 hours. The mixture is then allowed to cool and poured onto ice. The obtained aqueous phase is extracted by means of 500 cm³ of benzene.

The benzene extract is washed two times with 200 cm³ of water and the benzene is then evaporated.

The residue is treated with 500 cm³ of hydrochloric acid (2 N). The obtained solution is evaporated to dryness and the oily residue is recrystallized from ethanol. 176.9g (Yield: 89.4%) of dihydrochloride of N-phenyl-N-diethylaminopropyl-2-aminoindane are obtained.

Melting point: 208°-210°C.

The dihydrochloride is converted into monohydrochloride by dissolving 26.36 grams (0.066 mole) of dihydrochloride into 158 cm³ cm³ of water, adding drop by drop a suitable amount (0.066 mole) of caustic soda (1N), evaporating the aqueous solution to dryness, drying by means of benzene, filtering the formed sodium chloride (3.8 grams) and crystallizing the cooled obtained benzene solution. 22.6 grams (95%) of monohydrochloride are obtained. Melting point: 120°-121°C.

Analysis:

a. dihydrochloride.

Calculated: C:66.82%; H:8.15%; N:7.08%; Cl : 17.9%. Found: C 65.83%; H:8.19%; N:7.27%;
b. monohydrochloride Calculated: C:73.61%; H:8.7%; N:7.8%; Cl: 9.88%.
Found: C:72.9%; H:8.9%; N:7.90%; Cl: 10.2%.

EXAMPLE 2.

Preparation of N-phenyl-N-dimethylaminopropyl-2-aminoindane monohydrochloride (formula I; A = phenyl; $R_1=R_2=CH_3$; $n=2$; $Z = H_2$; B = H)

This compound is prepared as described in example 1, except that γ-chloropropyl dimethylamine is used in place of γ-chloropropyl diethylamine.

The monohydrochloride of N-phenyl-N-dimethylaminopropyl-2-aminoindane, obtained with a yield of 85%, melts at 150-153°C.

EXAMPLE 3.

Preparation N-phenyl-N-dipropylaminopropyl-2-aminoindane and the dihydrochloride thereof (formula I: A=phenyl; $R_1=R_2=C_3H_7$; $n = 2$; $Z =H_2$; B = H)

This compound is prepared as described in example 1, except that γ-chloropropyl dipropylamine is used in place of γ-chloropropyl diethylamine. The amine obtained with a yield of 75% has a distillation temperature range of 172°–175°C under 0.85 mm of Hg.

Analysis: of the dihydrochloride -M.P. : 175° – 177°C ($C_2H_3OH$-ether)

Calculated: C: 68.07; H:8.57%; N:6.6%; Cl:16.74%.
Found: C: 68.69; H:8.7%; N: 6.36%; Cl:16.20%.

EXAMPLE 4.

Preparation of N-phenyl-N-diethylaminoethyl-2-aminoindane and the monohydrochloride thereof.

(formula I; A=phenyl; $R_1=R_2 = C_2H_5$; $n = 1$; $Z= H_2$; B = H).

This compound is prepared as described in example 1, except has β-chloroethyl diethylamine is used in place of γ-chloropropyl diethylamine. The amine obtained with a yield of 90% has a distillation temperature range of 185°–190°C under 1 mm of Hg.

Analysis: of the monohydrochloride -M.P.: 127°–129°C ($CHCl_3$+ ether and $C_2H_5OH$ + ether)

Calculated: C:73.12%; H:8.4%; N:8.1%; Cl:10.3%.
Found: C:72.8%; H:8.78% N:8.06%; Cl:10.03%.

EXAMPLE 5.

Preparation of N-phenyl-N-dimethylaminoethyl-2-aminoindane and the monohydrochloride thereof.

(Formula I; A=phenyl; $R_1=R_2=CH_3$; $n=1$; $Z=H_2$; B = H)

This compound is prepared as described in example 1, except that β-chloroethyl dimethylamine is used in place of γ-chloropropyl diethylamine. The amine obtained with a yield of 65% has a distillation temperature range of 150°–153°C under 0.4 mm of Hg.

Analysis: of the monohydrochloride -M.P.:215°–217°C (anhydrous $C_2H_5OH$)

Calculated: C:72.01%; H:7.95%; N:8.84%; Cl: 11.19%. Found: C:71.09%; H:8.01%; N:8.98%; Cl: 11.08%.

EXAMPLE 6.

Preparation of N-phenyl-N-piperidinoethyl-2-aminoindane and the monohydrochloride thereof (formula I; A=phenyl;

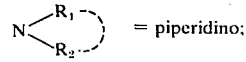 = piperidino;

$n = 1$; $Z = H_2$; B = H

This compound is prepared as described in example 1, except that β-chloroethyl piperidine is used in place od γ-chloropropyl diethylamine. The amine obtained with a yield of 80.5% has a distillation temperature range of 170°–179°C under 0.85 mm of Hg.

Analysis: of the monohydrochloride -M.P.: 229°–232°C (solvent for crystallization: $H_2O$).

Calculated: C: 74.02%; H:8.19%; N:7.85%; Cl:9.9.%.
Found: C:74.43%; H:8.54%; N:7.7%; Cl: 9.52%.

EXAMPLE 7.

Preparation of N-phenyl-N-morpholinoethyl-2-aminoindane and the monohydrochloride thereof (formula I; A=phenyl;

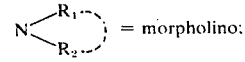 = morpholino;

$n = 1$; $Z = H_2$; B = H)

This compound is prepared as described in example 1, except that β-chloroethyl morpholine is used in place of γ-chloropropyl diethylamine. The amine obtained with a yield of 86.5% has a distillation temperature range of 178°–184°C under 0.45 mm of Hg.

Analysis: of the monohydrochloride M.P.: 199.5°–202.5°C (H₂O)

Calculated: C:70.27%; H:7.58%; N:7.8%; Cl:9.87%. Found: C:70.26%; H:7.52%; Cl:9.72%.

EXAMPLES 8 TO 14

Preparation of N-phenyl-substituted phenyl-N-diethylaminopropyl-2-aminoindanes (formula I; A= substituted phenyl; $R_1$=$R_2$ = $C_2H_5$; $n$=2; Z=$H_2$; B=H)

a. Preparation of N-substituted phenyl-2-aminoindanes

A series of N-substituted phenyl-2-aminoindanes have been prepared by the method described in example 1, a,b, using a substituted aniline in place of unsubstituted aniline.

The following table shows the melting point of the obtained compounds and of the hydrochlorides thereof.

TABLE 2

| substituent of the phenyl ring | Melting point °C | Molecular weight | Melting point of hydrochloride °C |
|---|---|---|---|
| 2—Cl | 59–60 | 243.73 | 182 – 184 |
| 3—Cl | 42–43 | 243.73 | 158 – 164 |
| 4—Cl | 98–100 | 243.73 | — |
| 2—CH₃ | 63–65 | 223.30 | 215 – 217 |
| 3—CH₃ | 72–74 | 277.27 | 213 – 215 |
| 4—OCH₃ | 64–66 | 239.29 | 179 – 182 |
| 2—6—CH₃—CH₃ | 63–65 | 237.32 | — |

B. Preparation of N-substituted phenyl-N-diethylaminopropyl 2-aminoindanes.

A series of N-substituted phenyl-N-diethylaminopropyl-2-aminoindanes have been prepared by the method described in example 1, B from the N-substituted phenyl-2-aminoindanes of Table I. The following table II shows the melting point of the indicated acid addition salts obtained by said process, as well as the analytical data of the obtained compounds.

EXAMPLE 15

Preparation of N-9-hydroxyphenyl)-N-γ-diethylaminopropyl)-2-aminoindane dihydrochloride (formula I:A= 4-hydroxyphenyl; $R_1 = R_2 = C_2H_5$; $n$ = 2; Z = $H_2$; B = H.)

4.2g of N-(4-methoxyphenyl)-N-(γ-diethylaminopropyl)-2-aminoindane, 36 ml of acetic acid and 36 ml of hydrobromic acid (48) are refluxed during 12 hours. After cooling, the pH is brought to 8 by addition of ammonium hydroxyde. The obtained oil is extracted by means of chloroform. After drying, a stream of dry hydrochloric acid is passed through the chloroform solution. After evaporation of the chloroform, the product is crystallized from isopropanol. M.P. of the dihydrochloride (+ 1 mol H₂O): 145°–146°C.

Analysis: Calculated: C :61.52;H:7.98%;N:6.52%; Cl:16.51%. Found: C :61.93%; H:8.04%; N:676%; Cl:16.55%.

EXAMPLE 16

Preparation of N-(2,6-dichlorophenyl)-N-(γ-diethylaminopropyl)-2-aminoindane monohydrochloride (formula I: A = 2,6-dichlorophenyl; $R_1 = R_2 = C_2H_5$; $n$= 2; Z = $H_2$; B = H) A. Preparation of N-(2,6-dichlorophenyl)-2-aminoindane 2.12 g of 2-indanol mesylate, 12.96g of 2,6-dichloroaniline and 40 ml of toluene are refluxed during 24 hours. The toluene phase is then washed with water, dried and evaporated. By distillation 0.02g of an oil are obtained at 120°C under a pressure of 0.02 mm.

Analysis: Calculated: C: 64.76%; H:4.71%; N:5.04%; Cl:25.49%. Found: C: 64.4%; H:4.6%; N:4.99%; Cl: 25.8%.

B. Preparation of N-(2,6-dichlorophenyl)-N-(γ-diethylaminopropyl)-2-aminoindane monohydrochloride 21.35g of N-(2,6-dichlorophenyl)-2-aminoindane, 14.3 ml of γ-chloropropyldiethylamine, 4.6g of sodium amide (NaNH₂) and 250 ml of benzene are refluxed during 8 hours.

From the obtained mixture, the monohydrochloride is prepared in the usual way. After recrystallization from benzene (1/3) and cyclohexane (2/3), the desired monohydrochloride melts at 138.3°C Analysis: Calculated: C:61.8%; H: 6.4%; N:6.55%; Cl 25.19%. Found: C:61.76%; H: 6.82; N:6.55%; Cl: 24.86%.

TABLE 3

| Example | Substituent of the phenyl ring | Acid addition salt | Melting point °C | Molecular weight | Analysis |
|---|---|---|---|---|---|
| 8 | 2—Cl | fumarate | 126–128 | 473.00 | Cal.C:66.01;H:7.03;N:5.92;Cl7.49%<br>Found:C:65.90;H:7.07;N:6.00;Cl7.52% |
| 9 | 3—Cl | oxalate | 163–165 | 446.97 | Cal.C:64.49;H:6.99;N:6.27;Cl.7.93%<br>Found:C:64.13;H:6.88;N:6.38;Cl.8.08% |
| 10 | 4—Cl | fumarate | 138–140 | 473.00 | Cal.C:66.01;H:7.03;N:5.92;Cl.7.49%<br>Found:C:65.98;H:7.11;N:6.01;Cl.7.60% |
| 11 | 2—CH₃ | fumarate | 115–117 | 452.56 | Cal.C:71.65;H:8.01;N:6.18%<br>Found:C:71.71;H:7.98;N:6.20% |
| 12 | 3—CF₃ | fumarate | 105–107 | 506.54 | Cal.C:64.01;H.6.56;N:5.52%<br>Found:C:64.13;H.6.48;N:5.48% |
| 13 | 4—OCH₃ | oxalate | 125–128 | 442.53 | Cal.C:67.85;H:7.74;N:6.32%<br>Found:C:67.78;H:7.72;N:6.41% |
| 14 | 2—6—CH₃ | oxalate | 155–160 | 440.55 | Cal.C:70.87;H:8.23;N:6.41%<br>Found:C:70.82;H:8.30;N:6.50% |

EXAMPLE 17.

Preparation of
N-phenyl-N-[(4-methylpiperazino)-propyl]-2-aminoindane (formula I; A = phenyl;

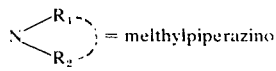 = melthylpiperazino n=2; Z=H₂; B=H)

A Preparation of
N-phenyl-N-β-chloropropionyl-2-aminoindane 0.04 mol of N-phenyl-2-aminoindane are acylated by means of 0.06 mol of the chloride of β-chloropropionic acid in 50 ml of benzene. After reflux heating during 5 hours, the solvent is evaporated and the residue is recrystallized from petroleum ether. The obtained product melt at 85°C.

Analysis Analysis: C: 42.11; H:6.05; Cl: 11.8%. Found: C: 72.39; H:6.01; Cl: 11.82%.

B Preparation of
N-phenyl-N-γ-chloropropyl-2-aminoindane hydrochloride.

A solution of 45g of the acylated product obtained as described under a hereabove in 1000 ml of ether is added drop by drop to a mixture of 500 ml of ether and 8.7g of lithium-aluminum hydride (AlLiH₄) at room temperature. After this addition, the reaction mixture is refluxed during 2 hours.

By extraction by means of ether, an oil is obtained (41g), which is converted into the hydrochloride by passing a stream of dry hydrochloric acid through an ether solution of the product. Crystals melting at 144°–146°C are obtained.

Analysis: Calculated: Cl : 22%. Found: Cl : 21.57%.

C. Preparation of
N-phenyl-[(4-methylpiperazino)-propyl]-2-aminoindane 6.44 g of N-phenyl-N-p-chloropropyl-2-aminoindane and 15.84g 17.6 ml) of N-methylpiperazine are refluxed in 50 ml of ethanol during 20 hours. The ethanol and the excess of methylpiperazine is then evapored and the residue is treated with water and subsequently extracted with petroleum ether. After drying and evaporation of the organic phase, a residue (7g) is obtained, which is converted into the hydrochloride at a.pH of 6. The hydrochloride (6.5g) is extracted by means of dichloromethane and recrystallized form methylethylketone, M.P:156°–158°C Analysis: Calculated: C:71.57%; H:8.36%; N:10.89%; Cl:9.13%. Found: C:71.49%; H:8.20%; N:10.91%; Cl:9.21%.

EXAMPLE 18.

Preparation of
N-phenyl-N-(δ-diethylaminobutyl)-2-aminoindane (formula I: A = phenyl; R₁ = R₂ = C₂H₅; n = 3; Z = H₂; B = H)

a. Preparation of
N-phenyl-N-γ-chlorobutyroyl-2-aminoindane.

53ml (0.4 mol) of the chloride of γ-chlorobutyric acid are added drop by drop, at a temperature of 20°C, to a solution of 41.86g of 2-phenylaminoindane in 270 ml of benzene. The mixture is refluxed during 2 hours and then concentrated to dryness. The oily residue is washed with petroleum ether (B.P.: 40°– 60°C) and the insoluble oil is crystallized from cyclohexane. M.P. 76°– 77°C.

Analysis: Calculated: C: 72.41 H:6.42 N:4.46 Cl:11.30 %. Found: C: 72.73 H:6.37 N:4.64 Cl: 10.30%.

B. Preparation of
N-phenyl-N-(γ-diethylaminobutyrol)-2-aminoindane 19 g (0.062 mol) of N-phenyl-N-(γ-chlorobutyrol)-2-aminoindane, 28 ml of diethylamine and 70 ml of ethanol are heated in an autoclave at 100°C during 24 hours. After cooling and evaporation, the residue is treated with a 1N caustic soda solution and extracted with benzene.

The obtained product is purified by converting it in oxalate. The pure recovered base is crystallized from a mixture of methylethylketone and methanol. M.P.: 121°–122°C Analysis: Calculated: C: 68.16%; H: 7.32%; N: 6.36%; Cl: 18.16%. Found: C: 68.03%; H: 7.04%; N: 6.53%; Cl:.

C. Preparation of
N-phenyl-N-(δ-diethylaminobutyl)-2-aminoindane

A solution of 13.5 g of N-phenyl-N-(γ-diethylaminobutyroyl)-2-aminoindane in 200 ml of ether is added to 300 ml of ether containing 3.25g of Al Li H₄. The mixture is refluxed during 4 hours and, after cooling, 50 ml of water are added thereto. The separated ether phase is washed with water, dried and evaporated.

10.7g of an oil are obtained. This oil is treated with 50 ml of water and 32 ml of 1N hydrochloric acid. The acid phase is extracted with petroleum ether and with dichloromethane. The oil (12.5g) obtained after evaporation of the dichloromethane is recrystallized from ethyl accetate. M.P. 124°–125°C (hydrochloride)

Analysis: Calculated: C: 74.06%; H:8.92%; N: 7.51%; Cl: 9.51%. Found: C: 74.69%; H:8.48%; N: 7.72%: Cl: 9.47%.

EXAMPLE 19.

Preparation of
N-phenyl-N(piperidinobutyl)-2-aminoindane (A = phenyl;

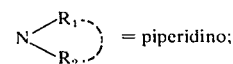 = piperidino;

n = 3; Z = H₂; B = H 2.24g of N-phenyl-N(-5-chlorobutyl)-2-aminoindane, 4.54g (5.3 ml) of piperidine and 50 ml of anhydrous ethanol are heated at 100°C in an autoclave during 24 hours. After cooling and evaporation, the residue is treated with water and made alkaline (pH 11). After extraction with benzene, washing drying and evaporation of the benzene, an oily residue is obtained.

This residue is treated with 1N hydrochloric acid and extracted by means of dichloromethane. The acid aqueous phase is brought to a ph of 6 and extracted by means of dichloromethane. The obtained monohydrochloride is recrystallized of a mixture of methylethylketone and methanol. M.P. 170°C Analysis: Calculated: C: 74.87%; H: 8.64%; N: 7.28%; Cl: 9.21%. Found: C: 74.75%; H: 8.55%; N: 7.34%; Cl: 9.29%.

EXAMPLE 20

Preparation of N-phenyl-N-(β-diethylaminopropyl)-2-aminoindane hydrochloride (formula I: A = phenyl; $R_1 = R_2$;

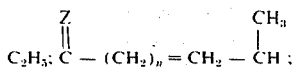

B = H)

A Preparation of N-phenyl-N-(α-chloropropionyl)2-aminoindane 14.65 g of N-phenyl-2-aminoindane, 10.4ml of the chloride of α-chloropropionic acid and 90 ml of benzene are refluxed during 2 hours. After concentration to dryness and crystallization from isopropanol, 21g of the desired product melting at 120°–121°C are obtained.

Analysis: Calculated: C:72.11%; H: 6.05%; N: 4.67%; Cl: 11.83%. Found: C:71.88%; H: 5.63%; N: 4.72%, Cl: 12.3%.

B Preparation of N-phenyl-N-(α-diethylaminopropionyl)-2-aminoindane 18.54 g (0.062 mol) of N-phenyl-N-(α-chloropropionyl)-2-aminoindane, 60 ml of anhydrous ethanol and 21 ml of diethylamine (0.19 mol) are heated at 120°C in an autoclave during 24 hours.

By recrystallization of the residue obtained by concentration to dryness from petroleum ether (B.P. 40°–60°C) the desired product melting at 74°–75°C is obtained.

Analysis: Calculated: C: 78.53%; H: 8.39%; N: 8.33%. Found: C: 78.44%; H. 8.55%; N: 8.60%.

C. Preparation of N-phenyl-N-(β-diethylaminopropyl)-2-aminoindane hydrochloride 9.85g of N-phenyl-N-(α-diethylaminopropionyl)-2-aminoindane and 150 ml of ether are added drop by drop to a suspension of aluminum lithium hydride in 100 ml of ether.

The obtained mixture is refluxed during 4 hours and 35 ml of water are added after cooling. The ether phase is then evaporated and the residue is treated with 1N hydrochloric acid.

The obtained acid phase is extracted successively with petroleum ether and dichloromethane. The residue from the dichloromethane phase is recrystallized from ethyl acetate. M.P. 158°–160°C Analysis: Calculated: C: 73.61%; H: 8.70%; N: 7.81%; Cl: 9.88%. Found: C: 73.75%; H: 8.60%; N: 7.86%; Cl: 10.15%.

EXAMPLE 21

Preparation of N-phenyl-N-(γ-dihydroxyethylaminopropyl)-2-aminoindane (formula I; A = phenyl; $R_1 = R_2$ = hydroxyethyl; $n=2$; Z = $H_2$; B = H)

A. Preparation of N-phenyl-N-(β-dihydroxyethylaminopropionyl)-2-aminoindane 6.93 g of N-phenyl-N-(β-chloropropionyl)-2-aminoindane and 14 ml of dihydroxyethylamine are heated on a water-bath during 30 minutes After dilution by water, the reaction mixture is made acid.

The obtained solution is treated with charcoal and filtered. The filtrate is concentrated to dryness and the residue is recrystallized from isopropanol M.P. 130°–131°C Analysis: Calculated: C: 65.25%; H: 7.22%; N: 6.92; %; Cl: 8.76%. Found: C: 65.26%; H: 7.17%; N: 7.10%; Cl: 8.9%.

B. Preparation of N-phenyl-N-(α-dihydroxyethylaminopropyl)-2-aminoindane fumarate 5.2g of N-phenyl-N-(β-dihydroxyethylaminopropionyl)-2-aminoindane are reduced by means of lithium aluminum hydride in ether by refluxing the mixture during 3 hours. The separated product is converted into the corresponding fumarate which is recrystallized from ethanol. M.P. 137°–138°C Analysis: Calculated: C: 66.36%; H: 7.28%; N: 5.95%. Found: C: 66.28%; H: 7.23%; N: 6.00%.

EXAMPLE 22.

Preparation of N-phenyl-N-(γ-dialkylaminopropyl)-2-aminoindane monohydrochloride (formula I; A = phenyl; $R_1 = R_2$ = allyl; $n = 2$; Z = $H_2$; B = H)

6.44g of N-phenyl-N-(γ-chloropropyl)-2-aminoindane, 15.54g of diallylamine and 50 ml of ethanol are heated at 100°C in an autoclave during 24 hours.

The reaction mixture is treated in the usual way, so as to obtain the monohydrochloride which melts at 138°–139°C after recrystallization from methylethylketone.

Analysis: Calculated: C: 75.26%; H: 8.16%; N: 7.31%; Cl: 9.26%. Found: C: 75.22%; H: 7.97%; N: 7.24%; Cl: 9.08%.

EXAMPLE 23

Preparation of N-phenyl-N-(γ-N'-ethyl-N'-propylaminopropyl)-2-aminoindane monohydrochloride (formula I; A = phenyl; $R_1 = C_2H_5$ ; $R_2 = C_3H_7$ ; $n = 2$; Z = $H_2$; B = H)

A. Preparation of N-phenyl-N-[(γ-N'-ethyl-N'-propionyl) aminopropyl]-2-aminoindane 8.6g of N-phenyl-N-(ethylaminopropyl)-2-aminoindane, 2.3 ml of the chloride of the propionic acid, 37 ml of anhydrous triethylamine and 200 ml of benzene are stirred during 1 hour at room temperature. After addition of 50 ml of water, the benzene phase is decanted by means of 100 ml of water, dried and evaporated.

An oily residue (9g) is obtained. By recrystallization from petroleum ether (B.P. 40°–60°C) a solid melting at 47°–49°C is obtained Analysis: Calculated: C: 78.81%; H: 8.63%; N: 7.99%. Found: C: 78.75%; H: 8.65%; N: 8.00%.

B. Preparation of N-phenyl-N-[γ-N'-ethyl-N'-propyl) aminopropyl]- 2-aminoindane monohydrochloride 1.5g of N-phenyl-N-[(γ-N'-ethyl-N'-propionyl) aminopropyl]-2-aminoindane dissolved in 70 ml of ether are added drop by drop to a suspension of 0.35g of lithium aluminum hydride in 120 ml of ether.

The obtained cooled mixture is refluxed during 3 hours.

The desired monohydrochloride is obtained by the usual extraction method. The oily residue obtained by extraction from the aqueous phase at a pH of 6, by means of dichloromethane is recrystallized from ethylacetate. M.P. 107°–108°C.

Analysis: Calculated: C: 74.06%; H: 8.92%; N: 7.51%; Cl:9.51%. Found: C: 74.01%; H: 8.85%; N: 7.25%; Cl:9.64%.

EXAMPLE 24

Preparation of N-phenyl-N-(γ-N'-methyl-N'-ethylaminopropyl)-2-aminoindane monohydrochloride (formula I; A = phenyl; $R_1 = CH_3$; $R_2H_5$; $n = 2$; $Z = H_2$; B = H)

6.44g (0.02 mol) pf N-phenyl-N-(γ-chloropropyl)-2-aminoindane hydrochloride, 9.44 g (0.16 mol) of methylethylamine and 50 ml of ethanol are heated at 100°C in an autoclave during 24 hours. After evaporation to dryness, the mixture is treated with a 0.1 N sodium hydroxide solution. The obtained mixture is extracted with dichloromethane, washed and dried. By evaporation of the dichloromethane, 6.3g of a residual oil are obtained. The monohydrochloride prepared from this oil and recrystallized in ethyl acetate melts at 126°–127°C Analysis: Calculated: C: 73.12%; H: 8.48%; N: 8.12%; Cl: 10.28%. Found: C: 73.01%; H: 8.53%; N: 8.21%; Cl: 10.57%.

EXAMPLE 25

Preparation of N-phenyl-N(γ-hydroxyethyl-ethylaminpropyl-2-aminoindane monohydrochloride (formula I; A = phenyl; $R_1 = C_2H_5$; $R_2 = C_2H_4OH$; $n = 2$; $Z = H_2$; B = H=

A. Preparation of N-phenyl-N-(β-hydroxyethyl-ethylaminopropionyl)-2-aminoindane monohydrochloride 20 g of N-phenyl-N-(β-chloropropionyl)-2aminoindane, 17.83g (19.6 ml – 0.2 mol) of ethylethanolamine and 100 ml of ethanol are refluxed during 24 hours.

After evaporation of the volatile materials, 150ml of a 0.1 N sodium hydroxide solution are added and the mixture is extracted with benzene. The residue of the benzene solution is dissolved in ether, a stream of gaseous hydrochloric acid being then passed through the ether solution. After recrystallization from methylethylketone, the desired hydrochloride melts at 90°–95°C.

Analysis: Calculated: C: 67.93%; H: 7.52%; N: 7.20%; Cl: 9.11%. Found: C: 68.12%; H: 7.64%; N: 7.50%; Cl: 9.17%.

B. Preparation of N-phenyl-N-(γ-hydroxyethyl-ethylamino)propyl 2-aminoindane monohydrochloride The N-phenyl-N-(γ-hydroxyethyl-ethylamino)-propionyl-2-aminoindane monohydrochloride is reduced by means of lithium aluminum hydride. The desired product recrystallised from ethylmethylketone melts at 98°–100°C Analysis: Calculated: C: 70.47%; H: 8.53%; N: 7.47%; Cl: 9.45%. Found: C: 70.55%; H: 8.10%; N: 7.52%; Cl: 9.42%.

EXAMPLE 26

Preparation of N-phenyl-N-(δ-methyl-propyl-amino-butyl)-2-aminoindane oxalate (formule I: A = phenyl; $R_1=CH_3$; $R_2=C_3H_7$; $n = 3$; $Z = H_2$; B = H)

6 g (0.02 ml) of N-phenyl-N-(δ-chlorobutyl)-2-aminoindane, 3.75g (0.05 mol) of methyl-propylamine and 50 ml of anhydrous methanol are refluxed under nitrogen during 24 hours. After cooling and evaporation of the volatile materials, 100 cc of a 0.1 N solution of sodium hydroxyde are added and the obtained mixture is extracted with dichloromethane. The extract is dried and evaporated. The residue is treated with 40 ml of 1N hydrochloric acid and the mixture is extracted with dichloromethane. The obtained extract is evaporated, brought to be pH of 6 and again extracted with dichloromethane.

After evaporation, an residual oil is obtained which is converted into an oxalate. The oxalate recrystallized from a mixture of ethyl acetate and methanol melts at 154°–157°C.

Analysis: Calculated: C: 70.39%; H: 8.13%; N: 6.57%. Found: C: 70.67%; H: 8.02%; N: 6.70%.

EXAMPLE 27

Preparation of 1-methoxy-2-[N'-phenyl-N-(diethylaminopropyl)]-aminoindane (formula I: A = phenyl; $R_1=R_2=C_2H_5$; $n = 2$; $Z = H_2$; B = $OCH_3$)

A. Preparation of mesylate of 1-methoxy-2-hydroxyindane 82g (0.5 mol) of 1-methoxy-2-hydroxyindane are dissolved in 250ml of pyridine. The solution is cooled at 0°C and 45 ml (0.55 mol) of chloride of methane sulfonic acid are added drop by drop to said solution, while maintaining the temperature between 0° and 5°C. The reaction mixture is then stirred during one hour at room temperature and subsequently poured onto ice. After filtration and drying, 113 g of the desired mesylate melting at 55°–75°C are obtained. The product is recrystallized from petroleum ether. Yield: 91%

Analysis: Calculated: C: 54.54%; H: 5.82%. Found: C: 54.67%; H: 5.82%.

B. Preparation of 1-methoxy-2-phenylaminoindane 60.5g of the mesylate obtained in section A and 125 ml of aniline are heated during 3 hours at 150°C. The reaction mixture is then cooled and extracted by means of 150 ml of ether. After separation of the precipitated aniline mesylate by filtration, the ether is removed from the filtrate and the filtrate is distilled. The desired product distils at 165°C/0.05 mm. The distilled product becomes solid and is recrystallized from isopropanol. Melting point: 53°–54°C.

Analysis: of the hydrochloride melting at 182°–184°C and recrystallized from acetone.

Calculated: C: 69.68%; H: 6.58%; N: 5.07%; Cl: 12.85%. Found: C: 69.65%; H: 6.55%; N: 5.18%; Cl: 12.68%.

C. Preparation of 1-methoxy-2-[N-phenyl-N-(diethylaminopropyl)]-aminoindane.

A mixture of 1.2 g (0.03 mol.) of $NaNH_2$, 30 ml of toluene and 0.015 mol. of 1-methoxy-2-phenylaminoindane is boiled during 30 minutes. 3.75 g of γ-chloropropyldiethylamine are then added and the mixture is refluxed during 3 hours. After cooling and addition of 50 ml of water, the toluene phase is separated, dried and concentrated, so as to obtain a residue (6.3g) which is treated with 2 grams of fumaric acid and 50 ml of water. The obtained solution is evaporated under vacuum and the residue is treated by means of 50 ml of ether. A solid product is obtained. After recrystallization from acetone or a mixture of acetone and methanol, 4.4 g of a product melting at 138°–140°C are obtained. Yield: 63%

Calculated: C: 69.2%; H: 7.74%; N: 5.97%. Found: C: 69.2%; H: 7.38%; N: 6.12%.

EXAMPLE 28

Preparation of 1-ethoxy-2-/N-phenyl-N-(diethylaminopropyl)/-aminoindane (formula I: A = phenyl; $R_1 = R_2 = C_2H_5$; $n = 2$; $Z = H_2$; $B = O_2CH_5$)

A. Preparation of 1-ethoxy-2-hydroxyindane 5 g of Na are dissolved in 140 ml of ethanol. To the obtained solution 42.3g of 1-hydroxy-2-bromoindane are added. The mixture is refluxed during 19 hours under nitrogen. 100 ml of ethanol are removed by distillation and 200 ml of ether are added. After cooling, the sodium bromide is separated by filtration and the ether is evaporated. The desired product is obtained by distillation at 87–90°C/0.05mm. Yield: 25.4 g (71%).

B. Preparation of the mesylate of 1-ethoxy-2-hydroxy-indane 0.07 mol of 1-ethoxy-2-hydroxyindane and 0.105 mol (10.6 grams) of distilled triethylamine are dissolved in 60 ml of anhydrous dichloromethane. 0.077 mole (8.82 grams) of $CH_3SO_2Cl$ are then added drop by drop to the solution which has previously been cooled to −5°C. The mixture is then stirred during 30 minutes at room temperature. The reaction mixture is diluted with 60 ml of dichloromethane and the obtained solution is successively washed with 10% hydrochloric acid (100 ml at 0°C), with a saturated solution of sodium bicarbonate (30 ml at 0°C) and with a saturated aqueous solution of sodium chloride (50 ml at 0°C). The organic phase is then dried and evaporated. 16.17 grams (94%) of a residue melting at 56°–57°C after recrystallization from isopropanol are obtained.

Analysis: Calculated: C: 56.23%; H: 6.29%; S: 12.51%. Found: C: 56.6%; H: 6.27%; S: 12.42%.

C. Preparation of 1-ethoxy-2-phenylaminoindane 60.5 g of the mesylate obtained in section B of example 28 and 125 ml of aniline are heated during 45 minutes at 150°C. After cooling, the mixture is treated with 150 ml of ether and the formed aniline mesylate is separated by filtration. The ether is removed from the filtrate and the excess of aniline is distilled. The residue of this distillation is treated with 6 N hydrochloric acid, so as to obtain the hydrochloride which is extracted by means of chloroform. The obtained solution is dried on sodium sulfate, filtered and concentrated to dryness. By addition of acetone 19.77 grams (yield = 56%) of the hydrochloride melting at 172°–173°C are obtained. After recrystallization from a mixture and methanol, the hydrochloride melts at 176°C.

Analysis of the hydrochloride: Calculated: C: 70.45%; H: 6.96%; N: 4.83%; Cl: 12.24%. Found: C: 70.85%; H: 6.88%; N: 5.0%; Cl: 12.1%.

The free base melts at 71°–72°C and is recrystallized from isopropanol.

Analysis of the base: Calculated: C: 80.59%; H: 7.66%; N: 5.53%. Found: C: 80.35%; H: 7.42%; N: 5.41%.

D Preparation of 1-ethoxy-2-[N-phenyl-N-(diethylaminopropyl]-aminoindane

This compound is prepared by the method used in section C of example 27, using 1-ethoxy-2-phenylaminoindane instead of 1-methoxy-2-phenylaminoindane. The duration of the reaction is 22 hours and the yield of 20%. The oxalate recrystallized from isopropanol melts at 133°–134°C.

Analysis: Calculated: C: 68.39%; H: 7.95%; N: 6.14%. Found: C: 68.2%; H: 7.74%; N: 6.05%.

EXAMPLE 29

Preparation of 1-methoxy-2[N-phenyl-N-(dimethylaminopropyl)-]aminoindane (formula I: A = phenyl; $R_1 = R_2 = CH_3$; $n = 2$; $Z = H_2$; $B = OCH_3$)

This compound is prepared by the method described in the example 27, section C, using γ-chloropropyldimethylamine instead of γ-chloropropyldiethylamine. The duration of the reaction is of 4 hours. Yield: 80%

The fumarate of the desired compound is recrystallized from acetone. Melting point 149° – 151°C Analysis: Calculated: C: 68.16%; H: 7.32%; N: 6.36. Found: C: 68.00%; H: 7.20%; N: 6.43%.

EXAMPLE 30

Preparation of 1-methoxy-2-[N-phenyl-N-(diethylaminoethyl)]-aminoindane (formula I; A = phenyl; $R_1 = R_2 = C_2H_5$; $n = 1$; $Z = H_2$; $B = OCH_3$)

A. Preparation of 1-methoxy-2-(N-phenyl-N-chloracetyl)-aminoindane 0.04 mol of 1-methoxy-2-phenylaminoindane and 0.06 mol of $ClCO-CH_2Cl$ are refluxed in benzene (50 ml) during 90 minutes. After cooling, the benzene is removed. The residue is washed with 20 ml of petroleum ether and recrystallized from petroleum ether. Melting point 104°–105°C. Yield: 95%

Analysis: Calculated: C: 68.46%; H: 5.74%; N: 4.43%; Cl: 11.23%. Found: C: 69.11%; H: 5.59%; N: 4.65%; CM: 11.47%.

B. Preparation of 1-methoxy-2-[N-phenyl-N-diethylaminoacetyl)]-aminoindane 5.8 g of 1-methoxy-2-(N-phenyl-N-chloracetyl)-aminoindane and 2.63g of diethylamine are dissolved in 50 ml of anhydrous ethanol. The solution is refluxed during 24 hours, but after 6 hours 1.32 grams of diethylamine are still added. When the reaction is finished, the alcohol is removed and the residue is treated with diluted hydrochloric acid. The obtained solution is made alkaline and extracted by means of chloroform. After removal of the chloroform a residue of 6 g is obtained. After recrystallization fom acetone, the hydrochloride melts at 188°–190°C Analysis: Calculated: C: 67.94%; H: 7.51%; N: 7.20; Cl: 9.11. Found: C: 68%; H: 7.48%; N: 6.98%; Cl: 9.28%.

C. Preparation of 1-methoxy-2-[N-phenyl-N-(diethylaminoethyl)]-aminoindane

The compound prepared in example 30, section B, is reduced by means of aluminum lithium hydride by a known method. The hydrochloride of the desired compound melts at 145°–147°C

EXAMPLE 31

Preparation of 1-methoxy-2-[N-phenyl-N-(diethylaminopropyl)]-aminoindane (formula I; A = phenyl; $R_1=R_2=C_2H_5$; $n = 2$; $Z = H_2$; $B = OCH_3$)

A. Preparation of 1-methoxy-2-(N-phenyl-N-β-chloropropionyl)-aminoindane monohydrochloride This compound is prepared as described in example 30, section A, using the chloride of β-chloropropionic acid instead of the chloride of chloroacetic acid. Yield: 90%. The desired product melts at 117°–118°C after recrystallization form petroleum ether (60° – 80°C).

Analysis: Calculated: C: 61.19%; H: 6.11%; N: 4.25%; Cl: 10.75%. Found: C: 64.9%; H: 6%; N: 4.35%; Cl: 10.60%.

B. Preparation of 1-methoxy-2-(N-phenyl-N-diethylaminopropionyl)-aminoindane This compound is prepared in the manner described in example 30, section B.

C. Preparation of 1-methoxy-2-(N-phenyl-N-diethylaminopropyl)-aminoindane monohydrochloride This compound is prepared by reduction of 1-methoxy-2-(N-phenyl-N-diethylaminopropionyl)-aminoindane by means of aluminum lithium hydride.

EXAMPLE 32

Preparation of 1-methoxy-2-[N-phenyl-N-(piperidinoethyl)]-aminoindane (formula I : A = phenyl;

$N\genfrac{}{}{0pt}{}{R_1}{R_2}$ = piperidino;

$n=1$; $Z=H_2$;

A. Preparation of 1-methoxy-2-(N-phenyl-N-piperidinoacetyl)-aminoindane.

This compound is prepared in the manner described in example 30, section B, except that piperidine is used instead of diethylamine.

The obtained free amine melts at 85°–86°C. Yield: 75%

The hydrochloride of the amine recrystallized from acetone melts at 216°–218°C.

| Analysis of the Hydrochloride: | C | H | N | Cl |
|---|---|---|---|---|
| % calculated | 68.9 | 7.29 | 6.98 | 8.84 |
| % found | 69.07 | 7.03 | 7.20 | 8.96 |

B. Preparation of 1-methoxy-2-[(N-phenyl-N-(piperidinoethyl)-]aminoindane.

This compound is prepared from 1-methoxy-2-(N-phenyl-N-piperidinoacetyl)-aminoindane by reduction by means of aluminum lithium hydride. The fumarate recrystallized from ethyl acetate melts at 140°–142°C.

| Analysis: | C | H | N |
|---|---|---|---|
| % calculated: | 69.5 | 7.34 | 6 |
| % found: | 69.7 | 7.22 | 5.93 |

EXAMPLE 33

Preparation of 1-dimethylamino-2-[(N-phenyl-N-(γ-diethylaminopropyl)]-aminoindane (formula I : A = phenyl; $R_1=R_2=C_2H_5$; $n=2$; $Z=H_2$; B=dimethylamino).

A. Preparation of 1-dimethylamino-2-phenylaminoindane 11.2 g of 1-dimethylamino-2-chloroindane hydrochloride are stirred during 2 hours at room temperature in 40 ml of aniline. The reaction mixture is treated by means of 75 ml of chloroform and the aniline hydrochloride is separated by filtration. The filtrate is evaporated to dryness, so as to remove the excess of aniline. The residue is treated with 250 ml of water. After addition of charcoal, the solution is filtered and made alkaline. By cooling in a refrigerator, the desired amine is obtained (11.5 g; Yield: 95%). After recrystallization from petroleum ether (60°–80°C) the product melts at 90°–92°C.

| Analysis: | C | H | N |
|---|---|---|---|
| % calculated: | 80.91 | 7.93 | 11.1 |
| % found: | 81.40 | 7.91 | 11.25 |
| Analysis of the fumarate: | C | H | N |
| % calculated: | 68.46 | 6.56 | 7.6 |
| % found: | 68.84 | 6.61 | 7.57 |

B. Preparation of 1-dimethylamino-2-[(N-phenyl-N(γ-diethylaminopropyl)]-aminoindane.

This compound is prepared from 1-dimethylamino-2-phenylaminoindane in the manner described in example 27, section C, except that the oxalate of the desired comound is prepared instead of the fumarate thereof. Yield: 75%. After recrystallization from ethanol, the oxalate melts at 195°–197°C.

Analysis:
(for 1 equivalent of the free amine and 1.5 equivalents of oxalic acid; molecular weight: 500.63 - $C_{27}H_{38}N_3O_6$)

|  | C | H | N |
|---|---|---|---|
| % calculated: | 64.77 | 7.65 | 8.39 |
| % found: | 64.66 | 7.73 | 8.05 |

EXAMPLE 34.

Preparation of 1-dimethylamino-2-[N-phenyl-N-(γ-dimethylaminopropyl)]-aminoindane (formula I : A=phenyl; $R_1=R_2=CH_3$; $n=2$; $Z=H_2$; B=dimethylamino).

This compound is prepared in the manner described in example 27, section C, from 3) 1-dimethylamino-2-phenyl-aminoindane by using γ-chloropropyldimethylamine as alkylating agent. The prepared Preparation (yield : 80%) melts at 193°–195°C. From the purified oxalate, the free amine is prepared and converted into difumarate which melts at 167°–169°C after recrystallization from acetone and methanol.

| Analysis: Molecular weight 569.66 ($C_{30}H_{39}N_3O_8$) | | | |
|---|---|---|---|
|  | C | H | N |
| % calculated: | 63.25 | 6.9 | 7.37 |
| % found: | 63.21 | 7.19 | 7.38 |

EXAMPLE 35.

Preparation of 1-dimethylamino-2-[N-metachlorophenyl-N-(γ-diethylaminopropyl)]-aminoindane (formula I : $R_1=R_2=C_2H_5$; $n = 2$; $Z=H_2$; B=dimethylamino; A=m-chlorophenyl).

A. Preparatin of 1-dimethylamino-2-m-chlorophenylaminoindane.

3 g of 1-dimethylamino-2-chloroindane hydrochloride and 15 ml of metachloroaniline are stirred during 3 hours at room temperature. After addition of 50 ml of chloroform, the metachloroaniline hydrochloride is filtered. The filtrate is evaporated to dryness and the residue is treated with water so as to obtain a solution. 3.2 g of the hydrochloride of the desired product are obtained (yield: 76%). By recrystallization from acetone, the monohydrochloride melts at 230°–232°C.

| Analysis: | C | H | N | Cl |
|---|---|---|---|---|
| % calculated: | 63.16 | 6.23 | 8.66 | 21.93 |
| % found: | 63.5 | 6.37 | 8.66 | 22.1 |

The corresponding free base melts at 69°–72°C.

B. Preparation of 1-dimethylamino-2-[N-metachlorophenyl-N-(γ-diethylaminopropyl)]-aminoindane.

This compound is prepared in the manner described in example 27, section C, using 1-dimethylamino-2-m-chlorophenylaminoindane instead of 1-methoxy-2-phenylaminoindane. Benzene is used as solvent and the duration of the reaction is 2 hours. The yield is 80%. The oxalate obtained by recrystallization from acetone and methanol melts at 186°–187°C.

| Analysis of the oxalate: Molecular weight:580.08 | | | | |
|---|---|---|---|---|
|  | C | H | N | Cl |
| % calculated: | 57.97 | 6.6 | 7.24 | 6.11 |
| % found: | 58.15 | 6.7 | 7.39 | 6.28 |

The fumarate obtained by recrystallization from ethanol melts at 146°–148°C.

| Analysis of the fumarate: | | | | |
|---|---|---|---|---|
|  | C | H | N | Cl |
| % calculated: | 60.80 | 6.69 | 6.64 | 5.6 |
| % found: | 60.65 | 6.48 | 6.44 | 5.35 |

EXAMPLE 36.

Preparation of 1-dimethylamino-2-[N-(p-methoxyphenyl)-N-(γ-diethylaminopropyl)]-aminoindane (formula : I : $R_1=R_2=C_2H_5$; $n = 2$; $Z=H_2$; B=dimethylamino; A = p-methoxyphenyl).

A. Preparation of 1-dimethylamino-2-p-methoxyphenylaminoindane.

8 g of 1-dimethylamino-2-chloroindane and 8.8 g of para anisidine are stirred during 15 hours at room temperature. The p-anisidine hydrochloride is filtered. The filtrate is evaporated to dryness and recrystallized from acetone. Yield: 50%. Melting Point: 213°–215°C.

| Analysis of the monohydrochloride. | | | | |
|---|---|---|---|---|
|  | C | H | N | Cl |
| % calculated: | 67.8 | 7.27 | 8.78 | 11.11 |
| % found: | 67.63 | 6.87 | 8.79 | 11.33 |

B. Preparation of 1-dimethylamino-2-[N-(p-methoxyphenyl)-N-(γ-diethylaminopropyl)]-aminoindane.

This compound is prepared in the manner described in example 27, section C, using 1-dimethylamino-2-p-methoxyphenylaminoindane instead of 1-methoxy-2-phenylaminoindane.

EXAMPLE 37.

Preparation of 1-ethylamino-2-[N-phenyl-N-(γ-diethylaminopropyl)]-aminoindane.

(formula I : B=ethylamino; A=phenyl; $n=2$; $Z=H_2$; $R_1=R_2=C_2H_5$).

A. Preparation of 1-ethylamino-2-phenylaminoindane.

2.7 g (0.011 mol) of 1-ethylamino-2-chloroindane and 20 ml of aniline are stirred during 6 hours at 65°–70°C. After cooling, the solvent and the excess of aniline are removed under vacuum. The residue is treated with water and the pH of the obtained solution is adjusted at 8. The insoluble material is filtered and recrystallized from petroleum ether (40°–60°C). Melting point: 108°–110°C. Yield: 85%.

| Analysis: | C | H | N |
|---|---|---|---|
| % calculated: | 80.91 | 7.99 | 11.09 |
| % found: | 80.86 | 7.96 | 11.40 |

B. Preparation of 1-ethylamino-2-[N-phenyl-N-(γ-diethylaminopropyl)]-aminoindane.

This compound is prepared in the manner described in example 27, section C, using 1-ethylamino-2-phenylaminoindane instead of 1-methoxy-2-phenylaminoindane.

EXAMPLE 38.

Preparation of 1-methylamino-2-[N-phenyl-N-(γ-diethylaminopropyl)]-aminoindane.

(formula I : B=methylamino; A=phenyl; $n=2$; $Z=H_2$; $R_1=R_2=$ ethyl).

A. Preparation of 1-methylamino-2-phenylaminoindane.

This compound is prepared in the manner described in example 37, section A, using 1-methylamino-2-chloroindane instead of 1-ethylamino-2-chlorindane, the reaction mixture being stirred at 120°C during 1 hour. The product recrystallized from ether melts at 120°–122°C. Yield: 50%.

| Analysis: | C | H | N |
|---|---|---|---|
| % calculated: | 80.63 | 7.61 | 11.75 |
| % found: | 80.62 | 7.60 | 11.64 |

B. Preparation of 1-methylamino-2-[N-phenyl-N-(γ-diethylaminopropyl)]-aminoindane.

This compound is prepared in the manner described in example 27, section C, using 1-methylamino-2-phenylaminoindane instead of 1-methoxy-2-phenylaminoindane.

EXAMPLE 39.

Preparation of 1-diethylamino-2-[N-phenyl-N-(γ-diethylaminopropyl)]aminoindane (formula I : $R_1=R_2=C_2H_5$; $n=2$; $Z=H_2$; B=diethylamino; A=phenyl).

A. Preparation of 1-diethylamino-2-phenylaminoindane.

24.5 g (0.094 mol) of 1-diethylamino-2-chloroindane and 100 ml of aniline are stirred during 1 hour at room temperature. After addition of 100 ml of chloroform, the aniline hydrochloride is separated by filtration and the filtrate is evaporated to dryness. The residue is extracted with 200 ml of water, made alkaline and extracted with ether. After drying on potassium carbonate and filtration, the solvents are removed and the product is distilled. The fraction distilling at 165°C/0.4 mm is collected. 20.6 g (Yield: 80%) of a product melting at 37°–39°C after recrystallization from petroleum ether (40°–60°C) are obtained.

| Analysis: | C | H | N |
|---|---|---|---|
| % calculated: | 81.38 | 8.62 | 9.99 |
| % found: | 81.38 | 8.80 | 10.12 |

B. Preparation of 1-diethylamino-2-[N-phenyl-N-(γ-diethylaminopropyl)]-aminoindane.

12.6 g of 1-diethylamino-2-phenylaminoindane are dissolved in 150 ml of toluene, in the presence of 3.51 g of $NaNH_2$(0.09 mol). After refluxing during 20 minutes 0.076 mol of γ-chloropropyldiethylamine are added, the mixture being then further refluxed during 1 hour. After cooling and addition of 100 ml of water, the mixture is decanted and extracted by means of 100 ml of toluene. The toluene phase is extracted by means of 1 N hydrochloric acid. The acid extract is made alkaline and extracted with benzene. After drying of the benzene phase on potassium carbonate, the benzene is evaporated and the product distilled. The fraction distilling at 210°C/0.9 mm is collected 14.8 g (Yield: 83%) of the desired product are obtained.

| Analysis: | C | H | N |
|---|---|---|---|
| % calculated: | 79.33 | 9.99 | 10.67 |
| % found: | 79.43 | 9.93 | 10.50 |

EXAMPLE 40.

Preparation of
1-diethylamino-2-[N-phenyl-N-(β-dimethylaminoethyl)]-aminoindane (formula I : $R_1=R_2=CH_3$; $n=1$; $Z=H_2$; B=diethylamino; A = phenyl)

This compound is prepared by the method described in example 39, section B, except that β-chloroethyldimethylamine is used instead of γ-chloropropyldiethylamine. Yield: 80%. The dihydrochloride obtained after recrystallization from acetone and methanol melts at 209°–210°C.

| Analysis: | C | H | N | Cl |
|---|---|---|---|---|
| % calculated: | 65.08 | 8.31 | 9.89 | 16.7 |
| % found: | 64.9 | 8.27 | 9.78 | 16.4 |

EXAMPLE 41.

Preparation of
1-methoxy-2-[N-phenyl-N-(diethylaminoethyl)]-aminoindane (formula I: $R_1=R_2=C_2H_5$; $n=1$; $Z=H_2$; $B=OCH_3$; A=phenyl).

9.6 g of 1-methoxy-2-phenylaminoindane, 2.4 g of $NaNH_2$ and 100 ml of benzene are refluxed during 30 minutes. 7 g of β-chloroethyldiethylamine are then added. The mixture is refluxed during 48 hours. After cooling, 100 ml of water are added to the reaction mixture which is then acidified. The aqueous phase is separated, made alkaline and extracted with chloroform. The chloroform phase is dried and the solvent is removed therefrom, the mixture being then distilled. The fraction distilling at 174°–177°C/0.1 mm is collected (10.3 g). The hydrochloride of the desired product is prepared in aqueous solution at a pH of 5.3. The aqueous solution is evaporated and dried with benzene (azeotropic distillation). 9.7 g of the desired hydrochloride are obtained. After recrystallization from ethylacetate, this hydrochloride melts at 145°–147°C.

| Analysis: | C | H | N | Cl |
|---|---|---|---|---|
| % calculated: | 70.46 | 8.33 | 7.47 | 9.46 |
| % found: | 70.38 | 8.33 | 7.63 | 9.28 |

EXAMPLE 42.

Preparation of
1-methoxy-2-[N-phenyl-N-(β-N'-piperidinoethyl)]-aminoindane.

(formula I :

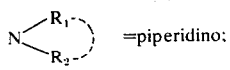 =piperidino;

$n=1$; $Z=H_2$; $B=OCH_3$; A=phenyl).

This compound is prepared in the manner described in example 41, except that β-chloroethylpiperidine is used instead of β-chloroethyldiethylamine. Yield: 50%

The fumarate of the desired product melts at 140°–142°C after recrystallization from ethylacetate.

| Analysis: | C | H | N |
|---|---|---|---|
| % calculated: | 69.50 | 7.34 | 6.00 |
| % found: | 69.70 | 7.22 | 5.93 |

EXAMPLE 43.

Preparation of
1-ethoxy-2-(N-phenyl-N-diethylaminoethyl)-aminoindane (formula I : $R_1=R_2=C_2H_5$; $n=1$; $Z=H_2$; $B=OC_2H_5$; A=phenyl)

A. Preparation of
1-ethoxy-2-(N-phenyl-N-chloracetyl)-aminoindane.

2.53 g of 1-ethoxy-2-phenylaminoindane, 2.5 ml of the chloride of chloracetic acid and 15 ml of benzene are refluxed during 30 minutes. The mixture is evaporated to dryness and the residue is extracted with petroleum ether. Yield: 91%. The desired product melts at 142°–143°C after recrystallization from benzene and cyclohexane.

| Analysis: | C | H | N | Cl |
|---|---|---|---|---|
| % calculated: | 69.19 | 6.11 | 4.25 | 10.75 |
| % found: | 69.19 | 5.90 | 4.07 | 11.1 |

B. Preparation of
1-ethoxy-2-[N-phenyl-N-(diethylaminoethyl)]-aminoindane

This compound is prepared as described in example 30, section B and C, using 1-ethoxy-2-(N-phenyl-N-chloracetyl)-aminoindane instead of 1-methoxy-2-(N-phenyl-N-chloracetyl)-aminoindane.

EXAMPLE 44.

Preparation of
1-ethoxy-2-[N-phenyl-N-(diethylaminopropyl)]-aminoindane (formula I : $R_1=R_2=C_2H_5$; $n=2$; $Z=H_2$; $B=OC_2H_5$; A=phenyl).

A. Preparation of
1-ethoxy-2-[N-phenyl-N-(β-chloropropionyl)]-aminoindane.

2.53 g of 1-ethoxy-2-phenylaminoindane, 2.5 ml of the chloride of β-chloropropionic acid and 15 ml of benzene are refluxed during 30 minutes. The mixture is then evaporated to dryness and the residue is extracted with petroleum ether (40°–60°C). 2.84 g (yield: 85%) of the desired product are obtained. After recrystallization from petroleum ether (40°–60°C), this product melts at 92°–93°C.

| Analysis: | C | H | N | Cl |
|---|---|---|---|---|
| % calculated: | 69.86 | 6.45 | 4.07 | 10.31 |
| % found: | 69.89 | 6.01 | 3.9 | 10.2 |

B. Parparation of 1-ethoxy-2-[N-phenyl-N-(diethylaminopropyl)]-aminoindane.

This product is prepared from 1-ethoxy-2-(N-phenyl-N-β-chloropropionyl)-aminoindane by reduction thereof by means of aluminum lithium hydride, so as to obtain 1-ethoxy-2-[N-phenyl-N-chloropropyl]aminoindane, the latter compound being reacted with diethylamine.

The oxalate of the desired compound recrystallized from isopropanol melts at 133°–134°C.

| Analysis: | C | H | N |
|---|---|---|---|
| % calculated: | 68.39 | 7.95 | 6.14 |
| % found: | 68.2 | 7.74 | 6.05 |

EXAMPLE 45.

Preparation of 1-methoxy-2-[N-phenyl-N-(piperidinopropyl)]-aminoindane hydrochloride.

(formula I : A=phenyl;

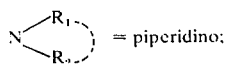 = piperidino;

$n=2$; $Z=H_2$; $B=OCH_3$.)

A. Preparation of 1-methoxy-2-(N-phenyl-N-piperidinopropionyl)-aminoindane hydrochloride.

10 g of 1-methoxy-2-[N-phenyl-N-(β-chloropropionyl)]-aminoindane prepared as described in example 31, section A, are dissolved in a solution of piperidine in ethanol. The reaction mixture is refluxed during 24 hours. After removal of the alcohol, the residue is treated with diluted hydrochloric acid. The obtained solution is made alkaline and extracted by means of chloroform. The residue of the chloroform extraction is dissolved in diluted hydrochloric acid and carefully dried under vacuum. The residue is treated with acetone and the obtained solution is filtered. By recrystallization from a mixture of acetone and methanol the desired hydrochloride is obtained.

B. Preparation of 1-methoxy-2-[N-phenyl-N-piperidinopropyl)]-aminoindane hydrochloride.

To a solution of 1-methoxy-2-(N-phenyl-N-piperidinopropionyl)-aminoindane in ether, a suspension of 2 g of lithium aluminum hydride in 100 ml of ether is continuously added. The obtained mixture is refluxed during 2 hours. After cooling with ice water, ice and water are added to the mixture which is then decanted and dried.

The obtained oil is treated with diluted hydrochloric acid and the pH is then brought to 6. After extraction with chloroform, the organic phase is dried and distilled under vacuum. The residue is treated with 100 ml of acetone and heated until a precipitate is obtained.

By recrystallization from a mixture of methanol and acetone the desired product melting at 173°–174°C is obtained.

| Analysis: | C | H | N | Cl |
|---|---|---|---|---|
| % calculated: | 71.88 | 8.29 | 6.98 | 8.84 |
| % found: | 72.04 | 8.20 | 7.01 | 8.64 |

EXAMPLE 46.

Preparation of 1-methoxy-2-[N-phenyl-N-(methylpiperazinopropyl)]-aminoindane trihydrochloride (formula I : A=phenyl;

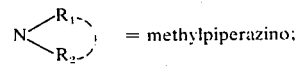 = methylpiperazino;

$n=2$; $Z=H_2$; $B=OCH_3$)

This compound is prepared as described in example 45 using methylpiperazine instead of piperidine. The obtained product melts at 230°–232°C.

| Analysis: | C | H | N | Cl |
|---|---|---|---|---|
| % calculated: | 58.95 | 7.42 | 8.59 | 21.75 |
| % found: | 58.92 | 7.50 | 8.98 | 21.40 |

EXAMPLE 47.

Preparation of 1-ethoxy-2-[N-phenyl-N-(diethylaminoethyl)]-aminoindane hydrochloride (formula : I : A=phenyl; $R_1=R_2=C_2H_5$; $n=1$; $Z=H_2$; $B=OC_2H_5$)

A. Preparation of 1-ethoxy-2-(N-phenyl-N-diethylaminoacetyl)aminoindane.

This compound is prepared by reacting 1-ethoxy-2-(N-phenyl-N-chloroacetyl)-aminoindane (prepared as described in example 43, section A) with dimethylamine as described in example 30, section B.

B. Preparation of 1-ethoxy-2-[N-phenyl-N-(diethylaminoethyl)]-aminoindane hydrochloride.

This compound which melts at 137°–138°C after recrystallization from ethyl acetate is obtained by the method described in example 45, section B using 1-ethoxy-2-(N-phenyl-N-diethylaminoacetyl)-aminoindane instead of 1-methoxy-2-(N-phenyl-N-piperidinopropyl)-aminoindane.

| Analysis: | C | H | N | Cl |
|---|---|---|---|---|
| % calculated: | 71.02 | 8.55 | 7.20 | 9.12 |
| % found: | 70.99 | 8.31 | 7.27 | 9.21 |

EXAMPLE 48.

Preparation of 1-ethoxy-2-[N-phenyl-N-(pyrrolidinopropyl)]-aminoindane hydrochloride (formula I : A=phenyl;

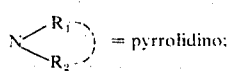 = pyrrolidino;

$n=2$; $Z=H_2$; $B=OC_2H_5$)

This compound is prepared by reacting 1 ethoxy-2-(N-phenyl-N-β-chloropopionyl)aminoindane, prepared as described in example 44, section A, with pyrrolidine in the manner described in example 45, section A, and by reducing the obtained 1-ethoxy-2-(N-phenyl-N-pyrrolidinopropionyl-aminoindane by means of lithium aluminum hydride as described in example 45, section B.

The obtained hydrochloride melts at 189°–190°C

| Analysis: | C | H | N | Cl |
|---|---|---|---|---|
| % calculated: | 71.46 | 8.28 | 6.86 | 9.42 |
| % found: | 71.88 | 8.29 | 6.99 | 9.46 |

EXAMPLE 49.

Preparation of
1-diethylamino-2-(N-phenyl-N-γ-dimethylaminopropyl)-aminoindane dihydrochloride (formula I: A=phenyl; $R_1=R_2=CH_3$; $n=2$; $Z=H_2$;

$B=N\begin{smallmatrix}R_1\\R_2\end{smallmatrix}$)

This compound is prepared by the method described in example 39, sections A, B and C, using 1-dimethylamino-2-chloroindane instead of 1-diethylamino-2-chloroindane and γ-chloropropyl-dimethylamine instead of γ-chloropropyldiethylamine.

The desired product melts at 202°–204°C after recrystallization from a mixture of methanol and acetone.

| Analysis: | C | H | N | Cl |
|---|---|---|---|---|
| % calculated: | 64.90 | 8.22 | 9.80 | 16.50 |
| % found: | 65.08 | 8.31 | 9.89 | 16.70 |

EXAMPLE 50.

Preparation of
N-phenyl-N-(γ-ethylaminopropyl)-2-aminoindane as well as mono and dichlorhydrochloride thereof.

(formula I: A=phenyl; $R_1=H$; $R_2=C_2H_5$; $n=2$; $Z=H_2$; $B=H$.)

A. Preparation of N-(β-chloropropionyl)-N-phenyl-2-aminoindane 0.04 mol of N-phenyl-2-aminoindane are acylated by means of 0.06 mol of β-chloropropionyl chloride in 50 cc of benzene. After 5 hours of reflux, the conversion is complete. The reaction medium is evaporated to dryness and the residue is recrystallized from petroleum ether. M.P. 85°C.

| Analysis: | C | H | Cl |
|---|---|---|---|
| % calculated: | 72.11 | 6.05 | 11.8 |
| % found: | 72.39 | 6.01 | 11.82 |

B. Preparation of N-(β-ethylaminopropionyl)-N-phenyl-2-aminoindane 17.8 g of N-(β-chloropropionyl)-N-phenyl-2-aminoindane and 100 cc of an ethanol solution containing 12% by weight of ethylamine are heated at 78°C during 21 hours in an autoclave. After evaporation of the solvent, the residue is extracted by means of 6 N hydrochloric acid. A precipitate of the hydrochloride is obtained by cooling in a refrigerator. By recrystallization from acetone, 19.34 g (yield :88%) of the hydrochloride melting at 180°C are obtained.

| Analysis: | C | H | Cl | N |
|---|---|---|---|---|
| % calculated: | 69.65 | 7.3 | 10.28 | 8.12 |
| % found: | 69.67 | 7.1 | 10.4 | 8.21 |

The free base is obtained by alkalinization and extraction by means of ether. The residue of the ether phase is used directly in the following step.

C. Preparation of N-phenyl-N-(γ-ethylaminopropyl)-2-aminoindane and the dihydrochloride thereof.

18.9 g of N-(β-ethylaminopropionyl)-N-phenyl-2-aminoindane (0.063 mol) are dissolved in 200 cc of anhydrous ether. The obtained solution is then poured drop by drop on 0.126 mol (4.8 g) of lithium aluminum hydride suspended in 100 cc of anhydrous ether. The obtained reaction medium is then refluxed during 2 hours. After cooling at 0°C, 50 cc of water are added drop by drop. The ether phases are brought together and dried. After evaporation of the ether, 15 g (yield : 77%) of a colourless oil are obtained. This product is the free base.

This free base is converted into the dihydrochloride by the usual method, using an aqueous acid medium. The aqueous phase is evaporated to dryness and the residue is extracted by means of 1N hydrochloric acid. The acid aqueous solution is then evaporated and the residue is recrystallized from a mixture of methanol and acetone. M.P.: 239°–240°C.

| Analysis of the dihydrochloride: | C | H | N | Cl |
|---|---|---|---|---|
| % calculated: | 65.39 | 7.68 | 7.61 | 19.3 |
| % found: | 65.21 | 7.71 | 7.63 | 19.18 |

D Preparation of the monohydrochloride of N-phenyl-N-(γ-ethylaminopropyl)-2-aminoindane.

This compound is obtained by the same method as used for preparing the dihydrochloride, except that the pH of the acid aqueous solution is adjusted at 6. The product obtained after recrystallization from methylethylketone melts at 138°–139°C.

| Analysis: | C | H | N |
|---|---|---|---|
| % calculated: | 72.59 | 8.23 | 8.47 |
| % found: | 72.78 | 7.90 | 8.51 |

EXAMPLE 51.

Preparation of the monohydrochloride of N-phenyl-N-(γ-methyl-aminopropyl)-2-aminoindane.

(formula I: A=phenyl; $R_1$=H; $R_2$=$CH_3$; n=2; Z=$H_2$; B=H.)

A. -Preparation of N-(β-methylaminopropionyl)-N-phenyl-2-aminoindane.

This compound is prepared in the manner described in the example 50 (sections A and B), except that methylamine is used in place of ethylamine.

After recrystallization from methylethylketone, the obtained hydrochloride melts at 202°–204°C.

| Analysis: | C | H | N |
|---|---|---|---|
| % calculated: | 68.97 | 7.01 | 8.47 |
| % found: | 68.95 | 6.94 | 8.36 |

B. Monohydrochloride of N-phenyl-N-(γ-methylaminopropyl)-2-aminoindane.

This compound is prepared in the manner described in the example 50 (section C) and melts at 181°–183°C after recrystallization from isopropanol.

| Analysis: | C | H | N |
|---|---|---|---|
| % calculated: | 72.01 | 7.95 | 8.84 |
| % found: | 71.09 | 7.75 | 8.85 |

EXAMPLE 52.

Preparation of the monohydrochloride of N-phenyl-N-(γ-propylaminopropyl)-2-aminoindane.

(formula I: A=phenyl; $R_1$=H; $R_2$=$C_3H_7$; n=2; Z=$H_2$; B=H)

A. Preparation of the hydrochloride of N-(β-propylaminopropionyl)-N-phenyl-2-aminoindane.

This compound is prepared in the manner described in the example 50 (sections A and B) except that propylamine is used in place of ethylamine. The obtained hydrochloride melts at 107.6°C after recrystallization from methylethylketone.

| Analysis: | C | H | N |
|---|---|---|---|
| % calculated: | 70.27 | 7.58 | 7.81 |
| % found: | 70 | 7.5 | 7.88 |

B. Preparation of the hydrochloride of N-phenyl-N-(γ-propylaminopropyl)-N-phenyl-2-aminoindane.

This compound is prepared in the manner described in the example 50 (section C) and melts at 154°C after recrystallization from isopropanol.

| Analysis: | C | H | N |
|---|---|---|---|
| % calculated: | 73.12 | 8.48 | 8.12 |
| % found: | 73.20 | 8.20 | 8.10 |

EXAMPLE 53.

Preparation of the monohydrochloride of N-phenyl-N(β-ethylaminoethyl)-2-aminoindane.

(formula I: A=phenyl; $R_1$=H; $R_2$=$C_2H_5$; n=1; Z=$H_2$; B=H)

A Preparation of N-phenyl-N-chloracetyl-2-aminoindane.

This compound is prepared as described in example 50 section A, chloracetyl chloride being used as acylating agent.

The obtained compound melts at 63°–64°C after recrystallization from cyclohexane.

| Analysis: | C | H | N | Cl |
|---|---|---|---|---|
| % calculated: | 71.45 | 5.64 | 4.9 | 12.41 |
| % found: | 71.62 | 5.61 | 5.17 | 12.45 |

B Preparation of N-phenyl-N-(ethylaminoacetyl)-2-aminoindane.

This compound is prepared in the manner described in example 50 section B.

The obtained product is recrystallized from acetonemethanol and melts at 223°–225°C.

| Analysis: | C | H | N | Cl |
|---|---|---|---|---|
| % calculated: | 68.97 | 7.0 | 8.46 | 10.71 |
| % found: | 68.89 | 6.85 | 8.57 | 10.69 |

C Preparation of N-phenyl-N-(β-ethylaminoethyl)-2-aminoindane.

This compound is prepared by the method described in example 50 section C. After recrystallization from water or ethylalcohol, the obtained product melts at 178°–180°C.

| Analysis: | C | H | N | Cl |
|---|---|---|---|---|
| % calculated: | 72.01 | 7.95 | 8.83 | 11.19 |
| % found: | 71.8 | 7.8 | 8.63 | 11.0 |

EXAMPLE 54

Preparation of N-phenyl-N-(δ-ethylaminobutyl)-2-aminoindane monohydrochloride.

(formula I: A=phenyl; $R_1$=H; $R_2$=$C_2H_5$; n=3; Z=$H_2$; B=H)

A. Preparation of N-phenyl-N-(δ-chlorobutyl)-2-aminoindane hydrochloride.

To a cooled solution of 13.6g of lithium aluminum hydride in 300 ml of ether, a solution of 53.37g of N-phenyl-N-(γ-chlorobutyroyl)-aminoindane (prepared as described in example 18, section A) in 800 ml of ether is added drop by drop. The obtained mixture is refluxed during 2 hours. After cooling, 150 ml of water are added drop by drop. The ether phase is separated, washed, died and evaporated to dryness.

The obtained oil is treated with 300 ml of isopropanol and 100 ml of 6N hydrochloric acid. A precipitate is obtained which is recrystallized from methanol. M.P. 198°–199°C.

Analysis: Calculated: C: 67.84%; H: 6.89%; N: 4.27%; Cl: 21.09%.
Found: C: 67.93%; H: 6.80%; N: 4.50%; Cl: 20.80%.

B. Preparation of N-phenyl-N-(δ-ethylaminobutyl)-2-aminoindane hydrochloride 6.72 g of N-phenyl-N-(δ-chlorobutyl)-2-aminoindane, 47 ml of solution ethylamine in alcohol (15.3g/100 ml) and 50 ml of ethanol are heated in an autoclave at 100°C during 24 hours. After cooling, the volatile materials are removed and the residue is treated with water and made alkaline (pH = 11). The product is extracted with benzene, washed and dried. An oily residue is obtained when the benzene is removed.

The oily residue to which 1N hydrochloric acid has been added is extracted with dichloromethane. The aqueous phase is brought to a pH of 6 and extracted with dichloromethane. 3.3g of the desired hydrochloride are obtained. This product melts at 158°–160°C after recrystallization from a mixture of methylethylketone and methanol.

Analysis: Calculated: C: 73.18%; H: 8.47%; N: 8.12%; Cl: 10.28%.
Found: C: 72.70%; H: 8.56%; N: 8.30%; Cl: 10.20%.

EXAMPLE 55

Preparation of N-phenyl-N-(allylaminobutyl)-2-aminoindane hydrochloride (formula I; A = phenyl; $R_1$ = H; $R_2$ = allyl; $n$ = 3; Z = $H_2$; B = H)

6.72g of N-phenyl-N-(δ-chlorobutyl)-2-aminoindane; 9.16g of allylamine and 80 ml of ethanol are heated in an autoclave at 100°C during 24 hours.

Using the method described in example 54, a monohydrochloride is obtained which melts at 113°–114°C after recrystallization from ethyl acetate.

Analysis: Calculated: C: 74.03%; H: 8.19%; N: 7.85%; Cl: 9.93%.
Found: C: 73.74%; H: 8.09%; N: 7.82%; Cl: 9.76%.

EXAMPLE 56

Preparation of N-phenyl-N-(β-methyl-γ-ethylaminopropyl)-2-aminoindane hydrochloride (formula I; A = phenyl; $R_1$ = H;

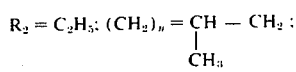

$Z = H_2$; B = H)

A. Preparation of N-phenyl-N-(β-chloro-α-methylpropionyl)-2-aminoindane

To a solution of 15g of N-phenyl-2-aminoindane in 150 ml of benzene, 14.6g of chloride of 3-chloroisobutyric acid an added. The mixture is refluxed during 4 hours. After cooling, the benzene is removed and the residue is extracted with petroleum ether. By recrystallization from petroleum ether(B.P. 40°–60°C), the obtained product melts at 92°–94°C.

Analysis: Calculated: C: 72.71%; H: 6.42%; N: 4.46%; Cl: 11.30%.
Found: C: 72.31%; H: 6.20%; N: 4.48%; Cl: 10.5%.

B. Preparation of N-phenyl-N-(γ-chloro-β-methylpropyl)-2-aminoindane

To 3.14g of N-phenyl-N-(β-chloro-α-methylpropionyl)-2-aminoindane in 80ml of anhydrous ether, 0.57g of lithium aluminum hydride are added. The obtained mixture is refluxed during 3 hours and treated in the usual way. The product is purified by conversion into the picrate M.P. 150°–152°C.

Analysis: Calculated: C: 56.76%; H: 4.76%; N: 10.6%; Cl: 6.70%.
Found: C: 56.64%; H: 4.71%; N: 10.5%; Cl: 6.71%.

By treating the picrate with ammonia, the free base is obtained as an oil which may be used in the following step.

C. Preparation of N-phenyl-N-(β-methyl-γ-ethylaminopropyl)-2-aminoindane

A mixture of 5g of N-phenyl-N-(γ-chloro-β-methylpropyl)-2-aminoindane, 29.8 ml of a solution of ethylamine in ethanol (20g/100ml) and 150 ml of ethanol is heated in an autoclave at a temperature of 100°C during 24 hours. After cooling and evaporation, the residue is treated with 100 ml of 0.1N NaOH and extracted with benzene. After evaporation, the oily residue is treated with 100 ml of 2N hydrochloric acid. The obtained mixture is extracted with benzene and the acid phase is brought to a pH of 6 and extracted with dichloromethane. After evaporation the oil is recrystallized from ethyl acetate. M.P. 137°–138°C.

Analysis: Calculated: C: 73.12%; H: 8.47%; N: 8.12%; Cl: 10.28%.
Found: C: 73.23%; H: 8.34%; N: 8.03%; Cl: 10.35%.

EXAMPLE 57

Preparation of N-phenyl-N-(γ-hydroxyethylaminopropyl)-2-aminoindane hydrochloride (formula I: A = phenyl; $R_1$ = H; $R_2$ = $CH_2CH_2OH$; $n$ = 2; Z = $H_2$; B = H)

6.44 g of N-phenyl-N-(γ-chloropropyl)-2-aminoindane, 9.77g of monoethanolamine et 50 ml of ethanol are heated in an autoclave at 100°C during 24 hours.

The mixture is then treated as described in example 56. The obtained monohydrochloride melts at 123°–125°C after recrystallization from methylethylketone.

Analysis: Calculated: C: 9.24%; H: 7.84%; N: 8.07%; Cl: 10.22%.
Found: C: 69.03%; H: 7.70%; N: 7.98%; Cl: 10.08%.

EXAMPLE 58

Preparation of N-phenyl-N-(γ-propargyllaminopropyl) 2-aminoindane oxalate (formula I: A = phenyl; $R_1$=H; $R_2$= propargyl; $n = 2$; $Z = H_2$; B = H)

6.44g of N-phenyl-N-(γ-chloropropyl)-2-aminoindane, 8.8g of propargylamine and 50 ml of anhydrous ethanol are autoclaved at 100°C during 24 hours.

The mixture is then treated as described in example 56. The oxalate melts at 194°–198°C after recrystallization from methanol.

Analysis: Calculated: C: 70.03%; H; 6,64%; N: 7.1%.
Found: C: 70.28%; H: 6.31%; N: 6.87%.

EXAMPLE 59

Preparation of
N-phenyl-N-(γ-allylaminopropyl)-2-aminoindane hydrochloride (formula I: A = phenyl; $R_1$ = H; $R_2$ = allyl; $n = 2$; $Z = H_2$; B = H 6.44g of N-phenyl-N-(γ-chloropropyl)-2-aminoindane, 9.12 g of allylamine and 50 ml of anhydrous ethanol are heated at 100°C in an autoclave during 24 hours.

The mixture is treated as described in example 56. The monohydrochloride is recrystallized from isopropanol. M.P. 146°–148°C Analysis: Calculated: C: 73.55%; H: 7.94%; N: 8.17%; Cl: 10.34%.
Found: C: 73.71%; H: 7.98%; N: 8.30%; Cl: 10.37%.

EXAMPLE 60

Preparation of
N-phenyl-N-(γ-tert.-butylaminopropyl)-2-aminoindane hydrochloride (formula I; A = phenyl; $R_1$ = H; $R_2$ = tert-butyl; $n = 2$; $Z = H_2$; B = H)

6.44g of N-phenyl-N-(γ-chloropropyl)-2-aminoindane, 11.69g of tert.-butylamine and 50 ml of anhydrous ethanol are treated in an autoclave at 100°C during 24 hours.

The mixture is then treated as described in example 56. Recrystallized from methylethylketone, the desired monohydrochloride melts at 180°–182°C.

Analysis: Calculated: C: 73.61%; H: 8.70%; N: 7.81%; Cl: 9.88%.
Found: C: 73.75%; H: 8.78%; N: 8.10%; Cl: 10.1%.

EXAMPLE 61

Preparation of
1-methoxy-2-[N-phenyl-N-(methylaminopropyl)]-aminoindane hydrochloride (formula I: A = phenyl; $R_1$ = H; $R_2$ = $CH_3$; $n = 2$; $Z = H_2$; B = $OCH_3$)

A. Preparation of
1-methoxy-2-[N-phenyl-N-(methylaminopropionyl)]-aminoindane hydrochloride 10g of 1-methoxy-2(N-phenyl-N-β-chloropropionyl)-aminoindane are dissolved in 70ml of a 33% solution of methylamine in ethanol. The mixture is refluxed during 24 hours. The ethanol is then removed and the mixture is treated with diluted hydrochloric acid. The obtained solution is made alkaline and extracted with chloroform. The residue of the chloroform solution is dissolved in diluted hydrochloric acid. After removal of water under reduced pressure, the residue is treated with acetone and filtered. The product is recrystallized from a mixture of methanol and acetone M.P. 210°–215°C Analysis: Calculated: C: 66.55%; H: 6.98%; N: 7.76%; Cl: 9.82%.
Found: C: 66.65%; H: 6.93%; N: 7.87%; Cl: 10.00%.

B. Preparation of
1-methoxy-2-[N-phenyl-N-(methylaminopropyl)-]-aminoindane to a solution of 1-methoxy-2-[N-phenyl-N-(methylaminopropionyl)]-aminoindane in 80 ml of anhydrous ether, a suspension of 2g of lithium aluminum hydride in 100 ml of ether is added. The obtained mixture is refluxed during 2 hours and then cooled with ice water. After decantation and drying, the obtained oil is treated with diluted hydrochloric acid. The pH of the solution is brought to 6 and the solution is extracted by means of chloroform. The organic phase is dried and distilled under reduced pressure. The residue is treated with 100 ml of acetone and heated until a precipitate is obtained.

The desired hydrochloride is recrystallized from a mixture of methanol and acetone. M.P. 139°–140°C Analysis: Calculated: C: 69.24%; H: 7.84%; N: 8.04%; Cl: 10.28%.
Found: C: 69.50%; H: 7.74%; N: 8.05%; Cl: 10.20%.

EXAMPLE 62 to 64

By the method described in example 61, the hydrochloride of the compounds of formula 1, wherein A represents a phenyl group, $R_1$, represents hydrogen, Z represents two hydrogen atoms, whereas $R_2$, $n$ and B have the meaning indicated in the following table are prepared.

TABLE I.

| Exam- | $R_2$ | n | B | Analysis | M.P.°C |
|---|---|---|---|---|---|
| 62 | $C_2H_5$ | 2 | $OCH_3$ | C.C:69.87%;H:8.09%;N:7.76%;Cl:9.82% F.C:70.01%;H:7.90%;N:7.70%;Cl:9.60% | 151–152 |
| 63 | $C_2H_5$ | 1 | $O.C_2H_5$ | F.C:69.88%;H:8.10%;N:7.76%;Cl:9.82% C.C:69.73%;H:7.99%;N:7.68%;Cl:9.81% | 178–179 |
| 64 | $C_2H_5$ | 2 | $O.C_2H_5$ | F.C:70.47%;H:8.33%;N:7.47%;Cl:9.46% C.C:70.18%;H:8.22%;N:7.56%;Cl:9.42% | 124–126 |

EXAMPLE 65

Preparation of
N-phenyl-N-dimethylaminoacetyl-2-aminoindane
hydrochloride (formula I: A = phenyl; $n = 1$; Z = O; $R_1=R_2=C_2H_5$, B = H)

B. Preparation of the hydrochloride of
N-phenyl-N-diethylaminoacetyl-2-aminoindane 8.4g of 2-phenylaminoindane (II) are refluxed during 5 hours in benzene in the presence of 4.7 ml of the chloride of chloracetic acid. The solvent is then removed under vacuum and the reisdual oil is treated with 100 ml of ethanol. 10 ml of diethylamine are added and the mixture is refluxed during 24 hours in an autoclave. The solvent is then removed under vacuum and the residue is extracted with 1N hydrochloric acid.

The obtained solution is made alkaline by means of ammonium hydroxide and the obtained product is extracted by means of an organic solvent which is not miscible with water, for example chloroform. After drying on sodium carbonate, the mixture is filtered and the chloroform is removed. The residual oil mixed with water is treated by means of hydrochloric acid so as to obtain the desired hydrochloride which is recrystallized from benzene. Melting poing: 183° – 186°C Analysis: Calculated: C: 70.27%; H: 7.58%; N: 7.80; Cl: 9.88%.

Found: C: 70.50%; H: 7.58%; N: 7.93%; Cl: 9.97%.

EXAMPLE 66

Preparation of the hydrochloride of
N-phenyl-N-dimethylaminoacetyl-2-aminoindane

[(A = phenyl; $n = 1$; $R_1=R_2=CH_3$, Z = O; B = 1, in formula (I)]

This compound is prepared in the manner described in example 65, except that dimethylamine is used instead of diethylamine, the final compound being recrystallized from isopropanol. The hydrochloride melts at 224°–226°C.

Analysis: Calculated: C:68.97%; H: 6.98%; N: 8.47%; Cl: 10.72%.

Found C:68.93%; H: 7.06%; N: 8.30%; Cl: 10.85%.

EXAMPLES 67 to 75

The following compounds of formula (I) have been prepared by the method described in example 65, using the appropriate amine of formula (V):

Example 67:

hydrochloride of N-phenyl-N-methylpiperazinoacetyl-2-aminoindane formula (I): A = phenyl, $n = 1$;

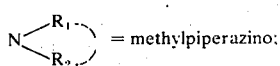 = methylpiperazino;

Z = 0; B = H)

Example 68:

hydrochloride of N-phenyl-N-pyrrolidinoacetyl-2-aminoindane (formula (I): A = phenyl; $n = 1$;

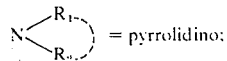 = pyrrolidino;

Z = O; B = H)

Example 69 hydrochloride of N-phenyl-N-dimethylaminopropionyl 2-aminoindane (formula (I): A = phenyl; $n = 2$; $R_1=R_2=CH_3$; Z = O; B = H)

Example 70 hydrochloride of N-phenyl-N-diethylaminopropionyl-2-aminoindane (formula (I): A = phenyl; $n = 2$; $R_1=R_2=C_2H_5$; Z = O; B = H)

Example 71 hydrochloride of N-phenyl-N-methylpiperazinopropionyl-2-aminoindane (formula (I): A = phenyl; $n = 2$;

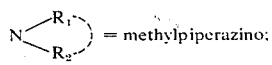 = methylpiperazino;

Z = O; B = H)

Example 72 hydrochloride of N-phenyl-N-pyrrolidinoproprionyl-2-aminoindane (formula (I): A = phenyl; $n = 2$;

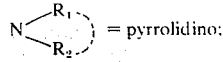 = pyrrolidino;

Z = O; B = H)

Example 73 hydrochloride of N-phenyl-N-dihydroxyethylaminopropionyl-2-aminoindane (formula (I): A = phenyl; $n = 2$; $R_1 = R_2 =$ hydroxyethyl; Z = O; B = H)

Example 74 hydrochloride of N-phenyl-N-monoethylaminoacetyl-2-aminoindane (formula (I): A = phenyl; $n = 1$; $R_1$=H; $R_2$= $C_2H_5$; Z = O; B = H)

EXAMPLE 75 hydrochloride of N-phenyl-N-monoethylaminopropionyl-2-aminoindane (formula (I): A = phenyl; $n = 2$; $R_1$=H; $R_2 = C_2H_5$; Z = O; B = H)

The following table 5 gives the melting point, the recrystallization solvents and the analytical data of the various hydrochlorides of the compounds of examples 67 to 75

TABLE 5

| Ex. | M.P °C | Recryst. solvents | Analysis |
|---|---|---|---|
| 67 | 204–205 | Isopropanol | Cal: C:68.46%; H:7.31%; N: 10.88%; Cl:9.19% |
| | | | Found: C:68.92%; H:7.51%; N: 10.91%; Cl:9.11 |
| 68 | 209–212 | Chloroform | Cal: C:71.23%; H:7.34%; N: 7.55%; Cl:9.56% |

TABLE 5-continued

| Ex. | M.P °C | Recryst. solvents | Analysis |
|---|---|---|---|
| 69 | 194–195 | Isopropanol | Found: C:71.00%; H:7.31%; N: 7.57%; Cl:9.50%<br>Cal: C:69.65%; H:7.31%; N: 8.12%; Cl:10.28% |
| 70 | 142–145 | Benzene | Found: C:69.75%; H:7.47%; N: 8.15%; Cl:10.30%<br>Cal: C:70.84%; H:7.83%; N: 7.51%; Cl:9.51% |
| 71 | 202–204 | Chloroform | Found:C:71.01%; H:7.84%; N: 7.61%; Cl:9.61%<br>Cal: C:69.06%; H:7.56%; N: 10.50%; Cl:8.86% |
| 72 | 153–155 | Benzene | Found: C:69.29%; H:7.66%; N: 10.11%; Cl:8.62%<br>Cal: C:71.76%; H:7.59%; N: 7.28%; Cl:9.21% |
| 73 | 132—133 | Isopropanol | Found: C:71.48%; H:7.67%; N: 7.06%; Cl:9.14%<br>Cal: C:65.25% H:7.22%; 65.25%;H:7.22%; N:6.92%; Cl:8.76% |
| 74 | 223–224 | Methanol | Found: C:25.26%; H:7.17% N: 7.10%; Cl:8.80%<br>Cal: C:68.97%; H:7.00%; N:8.46%; Cl:10.71% |
| 75 | 180.5 | acetone Methanol/methylethyl ketone | Found: C:69.89%; H:6.85%. N: 8.57%; Cl:10.69%<br>Cal: C:69.65%; H:7.31%; N: 8.12%; Cl:10.28%<br>Found: C:69.67%; H:7.10%; N:8.21%; Cl:10.27% |

EXAMPLE 76

Preparation of 1-methoxy-2-[(N-phenyl-N-(piperidinopropionyl)]aminoindane (formula I: A = phenyl;

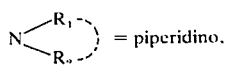 = piperidino.

$n = 2$; $Z = O$; $B = O.CH_3$)

This compound is prepared in the manner described in example 45, section A.M.P.; 78°–80°C Analysis: Calculated: C: 76.15%; H: 7.98%; N: 7.40%. Found: C: 75.90%; H: 7.74%; N: 7.54%.

EXAMPLE 77

Preparation of 1-methoxy-2-[N-phenyl-N-(methylaminopropionyl)]aminoindane hydrochloride (formula I: A = phenyl; $R_1 = H$, $R_2 = CH_3$; $n = 2$; $Z = O$; $B = O.CH_3$)

This compound is prepared in the manner described in example 61, section A. M.P. 210°–213°C.

Analysis: Calculated: C: 66.55%; H: 6.98%; N: 7.76%; Cl:9.82%. Found: C: 66.65%; H: 6.93%; N: 7.87%; Cl:10.00%.

EXAMPLE 78

Preparation of 1-methoxy-2-[N-pheny-N-(methylpiperazinopropionyl]aminoindane (formula I: A = phenyl,

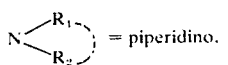 = piperidino.

$n = 2$; $Z = O$; $B = O.CH_3$

This compound is prepared as described in example 45, section A, using methylpiperazine instead piperidine. M.P. 100°–101°C Analysis: Calculated: C: 73.25%; H: 7.93%; N: 19.67%. Found: C: 73.11%; H: 7.91%; N: 19.47%.

EXAMPLE 79

Preparation of 1-methoxy-2-[N-phenyl-N-(pyrrolidinopropionyl)]-aminoindane hydrochloride (formula I: A = phenyl;

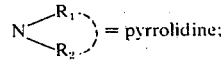 = pyrrolidine;

$n = 2$; $Z = O$; $B = OC_2H_5$)

This compound is prepared by reaction of 1-dethoxy-2-[N-phenyl-N-($\beta$-chloropropionyl)]-aminoindane with pyrrolidine. M.P. of the hydrochloride: 175° – 177°C Analysis: Calculated: C: 69.52%; H: 7.51%; N: 6.57%; Cl:8.50%. Found: C: 69.46%; H: 7.53%; N: 6.75%; Cl: 8.55%.

EXAMPLE 80

Preparation of N-phenyl-N-($\gamma$-diethylaminobutyroyl)-2-aminoindane (formula I: A = phenyl; $R_1 = R_2 = C_2H_5$; $n = 3$; $Z = O$; $B = H$)

This compound is prepared in the manner described in example 18, sections A and B

EXAMPLE 81

Preparation of N-phenyl-N-($\alpha$-diethylaminopropionyl)-2-aminoindane (formula I: A = phenyl; $R_1 = R_2 = C_2H_5$; $n = 2$;

This compound is prepared in the manner described in example 20, sections A and B.

EXAMPLE 82

Preparation of N-phenyl-N-(β-dihydrox ethylaminopropionyl)-2-aminoindane hydrochloride (formula I: A = phenyl; $R_1 = R_2 = CH_2CH_2OH$; $n = 2$; $Z = O$; $B = H$)

This compound is prepared in the manner described in example 21, section A.

EXAMPLE 83

Preparation of N-phenyl-N-(β-hydroxyethyl-ethylaminopropionyl)-2-aminoindane hydrochloride (formula I: A = phenyl; $R_1 = CH_2CH_2OH$; $R_2 = C_2H_5$; $n = 2$; $Z = O$; $B = H$)

This compound is prepared in the manner described in example 25, section A.

EXAMPLE 84

Preparation of N-(γ-dimethylaminopropyl)-N(-2-pyridyl-)-2-aminoindane hydrochloride (formula (I): A = pyridyl; $R_1 = R_2 = CH_3$; $n = 2$; $Z = H_2$; $B = H$)

A. Preparation of (2-pyridyl)-2-aminoindane 92 g of 2-aminopyridine are heated at 125°C and stirred under nitrogen. Indane mesylate is then added gradualy, so as to maintain the temperature at 125°-130°C. After the addition, the reaction mixture is still stirred during 15 minutes at 125°C. The reaction mixture is then cooled 200 ml of ether, 200 ml of water and caustic soda are then added so as to obtain a pH of 11. After decantation, the ether phase is washed with water and dried on potassium carbonate. By filtration of the dried product, 67g of an oil are obtained. This oil is distilled under reduced pressure (0.5mm). After removal of indene and 2-aminopyridine, 24g of a liquid distilling at 175°-178°C are obtained. This liquid becomes solid. M.P. 97°-98°C Analysis: Calculated: C: 79.96% H: 6.71% N: 13.32%. Found: C: 80.13% H: 7.2% N: 13.3%.

This compound may also be prepared by the following method.

A. Preparation of N-(2-pyridyl)-2-aminoindane (VIII)

2.12g of 2-indanol mesylate, 9.6g of 2-aminopyridine and 40 ml of anhydrous toluene are refluxed during 24 hours. After cooling, the reaction mixture is washed with 100 ml of water. The toluene phase is then separated and dried. After evaporation of the toluene, the residue is treated with 6N hydrochloric acid and filtered. The hydrochloric phase is evaporated to dryness and the base is liberated and extracted by means of benzene. After recrystallization from benzene, the desired product melts at 97°-98°C.

Analysis: Calculated: C: 79.96%;H: 6.71%; N: 13.3%. Found: C: 79.60%;H: 6.6%; N: 13.1%.

B. Preparation of N-(γ-dimethylaminopropyl)-N (-2-pyridyl)-2-aminoindane hydrochloride 0.034 mol of (2 pyridyl)-2-aminoindane and 0.051 mol of sodium amide are stirred at room temperature in 100 ml of benzene, under nitrogen. 0.0374 mol of γ-chloropropyldimethylamine are then added and the mixture is stirred during 1 hour at room temperature. After refluxing during 11 hours, the reaction mixture is cooled and 100 ml of water are added thereto. The mixture is then decanted and the benzene phase is concentrated to dryness. The residue is treated with 75 ml of 2N hydrochloric acid and extracted by means of dichloromethane. The pH of the aqueous solution is adjusted at 6.5 and this phase is extracted by means of chloroform. The chloroform solution is concentrated to dryness, the obtained residue is treated with 25 ml of acetone and the desired product is recrystallized from a mixture of acetone and methanol. M.P. 169°-170.5°C Analysis: Calculated: C: 68.76% H: 7.89% N: 12.66% Cl: 10.68% Found: C: 68.5% H: 7.75% N: 12.4% Cl: 10.5%

EXAMPLE 85

Preparation of N-(β-diethylaminoethyl)-N-(2-pyridyl)-2-aminoindane oxalate (formula (I) = A = pyridyl; $R_1 = R_2 = C_2H_5$; $n = 1$; $Z = H_2$; $B = H$)

This compound is prepared in the manner described in example 84, using diethylamino-β-chloroethylamine instead of γ-chloropropyldimethylamine.

The obtained oxalate recrystallized from acetone melts at 111°-114°C

Analysis: Calculated: C:66.14%;H: 7.32%N: 10.5%. Found: C:65.8% H: 7.2% N: 10.3%.

EXAMPLE 86

Preparation of N-(γ-ethylaminopropyl)N-(2-pyridyl)-2-aminoindane oxalate (formula (I): A = pyridyl; $R_1 = H$; $R_2 = C_2H_5$; $n = 2$; $Z = H_2$; $B = H$)

10g of (2-pyridyl)-2 aminoindane are heated during 24 hours at 100°C in 20 ml of 1-bromo-4-chloropropane.

The excess of the latter compound is then removed and to the residue 25 ml of ethanol, 20 ml of ethylamine and 2g of sodium iodide are added. The mixture is heated at 80°C in an autoclave during 24 hours.

Using the usual method, the hydrochloride of the desired product is obtained. Since this product cannot be crystallized, it is converted into the free amine, from which the oxalate is then prepared.

By recrystallization from a mixture of acetone and methanol, the oxalate melts at 203°-204°C.

Analysis: Calculated: C: 67.13% H: 7.1%; N: 10.2%. Found: C: 66.9%; H: 7.23%;N: 10.00%.

EXAMPLE 87

Preparation of N-(β-piperidinoethyl)-N-(2-pyridyl)-2-aminoindane (formula (I): A = pyridyl

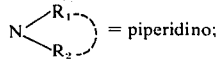 = piperidino;

$n = 1$; $Z = H_2$; $B = H$)

This compound is prepared by treating (2-pyridyl) 2-aminoindane with chloroethylpiperidine.

After refluxing the reaction mixture in benzene during 12 hours and cooling, water is added thereto and the organic phase is decanted and extracted by means of 1N hydrochloric acid. The pH is then adjusted to 5.5 – 6 and the obtained monohydrochloride is extracted with chloroform. After recrystallization from a mixture of acetone and methanol, said monohydrochloride melts at 204°–206°C

| Analysis: | C | H | N | Cl |
|---|---|---|---|---|
| % calculated: | 70.46 | 7.88 | 11.74 | 9.91 |
| % found: | 70.1 | 7.68 | 11.5 | 9.82 |

EXAMPLE 88

| Capsule | |
|---|---|
| Active ingredient | 100 mg |
| Lactose | 120 mg |
| Rice Starch | 30 mg |
| Corn Starch | 30 mg |
| Colloidal silica | 1 mg |
| | for one capsule |

EXAMPLE 89

| Tablet | |
|---|---|
| Active ingredient | 200 mg |
| Potato Starch | 120 mg |
| Lactose | 80 mg |
| Starch-sodium glycollate | 30 mg |
| Colloidal silica | 15 mg |
| Magnesium Stearate | 5 mg |
| Hydroxypropylcellulose | 4 mg |
| Stearic acid | 2 mg |

EXAMPLE 90

| Pills. | Core |
|---|---|
| Active ingredient | 50.0 mg |
| Lactose | 67.5 mg |
| Microcrystalline cellulose | 32.0 mg |
| Starch-sodium glycollate | 8.2 mg |
| Colloidal silica | 0.4 mg |
| Magnesium stearate | 0.9 mg |
| Coating | |
| Shellac | 1.0 mg |
| Sandarac | 0.2 mg |
| Castor oil | 0.3 mg |
| Gum arabic | 7.0 mg |
| Talc | 11.2 mg |
| Corn starch | 1.0 mg |
| Titanium oxide | 1.3 mg |
| Dyestuff (Patented Blue V) | 4.0 mg |
| Sucrose | 142.8 mg |
| White wax-carnauba wax | 0.2 mg |
| | for one pill |

EXAMPLE 91

| Solution for perfusion | |
|---|---|
| Active ingredient | 200 mg |
| Anhydrous sodium sulfite | 60 mg |
| Anhydrous sodium metabisulfite | 140 mg |
| Sodium chloride | 1.7 mg |
| Water for injection | ad 200 ml |

EXAMPLE 92

| Solution for perfusion | |
|---|---|
| Active ingredient | 200 mg |
| Anhydrous sodium sulfite | 60 mg |
| Anhydrous sodium metabisulfite | 140 mg |
| Sorbitol | 10 g |
| Water for injection | ad 200 ml |

EXAMPLE 93

| Concentrated solution for dilution prior to injection | |
|---|---|
| Active ingredient | 200 mg |
| Anhydrous sodium metabisulfite | 14 mg |
| Anhydrous sodium sulfite | 6 mg |
| Sodium chloride | 130 mg |
| Water for injection | ad 20 ml |

What we claim is:

1. A new derivative of 2-aminoindane of the formula:

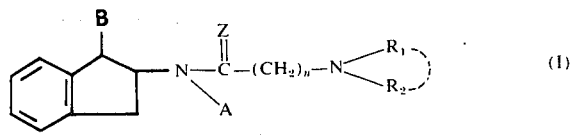

wherein $n$ is equal to 1, 2 or 3, Z represents two hydrogen atoms or an oxygen atom, the $(CH_2)_n$ group having a straight or branched chain, $R_1$ represents hydrogen, a lower alkyl or hydroxyalkyl radical containing 1 to 3 carbon atoms or a lower alkenyl or alkynyl radical containing 2 or 3 carbon atoms, $R_2$ represents a lower alkyl or hydroxyalkyl radical containing 1 to 3 carbon atoms or a lower alkenyl or alkynyl radical containing 2 or 3 carbon atoms, whereby $R_1$ and $R_2$ may be identical or different and may also form together with the adjacent nitrogen atom a nitrogenous heterocyclic ring selected among the piperidino, pyrrolidino, morpholino and piperazino rings, A is a 2-pyridyl radical, an unsubstituted phenyl radical or a phenyl radical substituted by at least one substituent selected among the lower alkyl, lower alkoxy, hydroxy, trifluoromethyl, halo and nitro groups in the ortho, meta and/or para position, and B represents hydrogen, an alkoxy radical containing 1 to 3 carbon atoms or a group of the formula

in which $R_3$ and $R_4$ which may be identical or different represent a lower alkyl or hydroxyalkyl radical containing 1 to 3 carbon atoms, whereby $R_3$ may also represent hydrogen as well as the pharmaceutically acceptable acid addition salts of said derivative of Formula (I).

2. A new derivative of 2-aminoindane according to claim 1, wherein in the Formula (I), $n$ is equal to 1, 2 or 3, Z represents two hydrogen atoms or one oxygen atom, the $(CH_2)_n$ group having a straight or branched chain, $R_1$ represents hydrogen, $R_2$ represents a lower alkyl or hydroxyalkyl radical containing 1 to 3 carbon atoms or a lower alkenyl or alkynyl radical containing 2 or 3 carbon atoms, A is a 2-pyridyl radical, an unsubstituted phenyl radical or a phenyl radical substituted by at least one substituent selected among the lower alkyl, lower alkoxy, hydroxy, trifluoromethyl, halo and nitro groups in the ortho, meta and/or para position and B represents hydrogen, an alkoxy radical containing 1 to 3 carbon atoms or a group of the formula

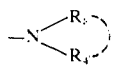

in which $R_3$ and $R_4$ represent a lower alkyl or hydroxyalkyl radical containing 1 to 3 carbon atoms, whereby $R_3$ may also represent hydrogen as well as the pharmaceutically acceptable acid addition salts of said new derivative.

3. A new derivative of 2-aminoindane according to claim 1, wherein in the Formula (I), $n$ is equal to 1, 2 or 3, Z represents two hydrogen atoms, the $(CH_2)_n$ group having a straight or branched chain, $R_1$ represents hydrogen, $R_2$ represents a lower alkyl or hydroxyalkyl radical containing 1 to 3 carbon atoms or a lower alkenyl or alkynyl radical containing 2 or 3 carbon atoms, A is a 2-pyridyl radical, an unsubstituted phenyl radical or a phenyl radical substituted by at least one substituent selected among the lower alkyl, lower alkoxy, hydroxy, trifluoromethyl, halo and nitro group in the ortho, meta and/or para position and B represents hydrogen, an alkoxy radical containing 1 to 3 carbon atoms or a group of the formula

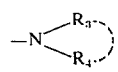

in which $R_3$ and $R_4$ represents a lower alkyl or hydroxyalkyl radical containing 1 to 3 carbon atoms, whereby $R_3$ may also represent hydrogen, as well as the pharmaceutically acceptable acid addition salts of said new derivative.

4. A new derivative of 2-aminoindane according to claim 1, wherein in the Formula (I), $n$ is equal to 1, 2 or 3, Z represents two hydrogen atoms, the $(CH_2)_n$ group having a straight or branched chain, $R_1$ represents hydrogen, $R_2$ represents a lower alkyl group containing 1 to 3 carbon atoms, A represents an unsubstituted phenyl group or a phenyl group substituted by at least one substituent selected among the lower alkyl, lower alkoxy, trifluoromethyl, halo and nitro group in the ortho, meta and/or para position and B represents hydrogen, as well as the pharmaceutically acceptable acid addition salts of said new derivative.

5. N-phenyl-N-(γ-ethylaminopropyl)-2-aminoindane as well as the pharmaceutically acceptable acid addition salts thereof.

6. A new derivative of 2-aminoindane according to claim 1, wherein in the Formula (I), $n$ is equal to 1, 2 or 3, Z represents two hydrogen atoms, the $(CH_2)_n$ group having a straight or branched chain, $R_1$ and $R_2$ which may be identical or different represent each a lower alkyl or hydroxyalkyl radical containing 1 to 3 carbon atoms or a lower alkenyl or alkynyl radical containing 2 or 3 carbon atoms, whereby $R_1$ and $R_2$ may also form together with the adjacent nitrogen atom a nitrogenous heterocyclic ring selected among the piperidino, pyrrolidino, morpholino and piperazino rings, A is a 2-pyridyl radical, an unsubstituted phenyl radical or a phenyl radical substituted by at least one substituent selected among the lower alkyl, lower alkoxy, hydroxy, trifluoromethyl, halo and nitro group in the ortho, meta and/or para position, and B represents hydrogen, an alkoxy radical containing 1 to 3 carbon atoms or a group of the formula

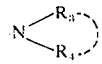

in which $R_3$ and $R_4$ which may be identical or different represent a lower alkyl or hydroxyalkyl group containing 1 to 3 carbon atoms, whereby $R_3$ may also represent hydrogen as well as the pharmaceutically acceptable acid addition salts of said derivative of Formula (I).

7. A new derivative of 2-aminoindane according to claim 1, wherein in the Formula (I), $n$ is equal to 1, 2 or 3, Z represents two hydrogen atoms, the $(CH_2)_n$ group having a straight or branched chain, $R_1$ and $R_2$ which may be identical or different represent each a lower alkyl or hydroxyalkyl radical containing 1 to 3 carbon atoms or a lower alkenyl or alkynyl radical containing 2 or 3 carbon atoms, whereby $R_1$ and $R_2$ may also form together with the adjacent nitrogen atom a nitrogenous heterocyclic ring selected among the piperidino, pyrrolidino, morpholino and piperazino rings, A represents an unsubstituted phenyl radical or a phenyl radical substituted in the ortho, meta and/or para position by at least one substituent selected among the lower alkyl, lower alkoxy, hydroxy, trifluoromethyl, halo and nitro groups and B represents hydrogen, as well as the pharmaceutically acceptable acid addition salts of said derivative.

8. N-phenyl-N-diethylaminopropyl-2-aminoindane as well as the pharmaceutically acceptable acid addition salts thereof.

9. N-phenyl-N-piperidinoethyl-2-aminoindane as well as the pharmaceutically acceptable acid addition salts thereof.

10. A new derivative of 2-aminoindane according to claim 1, wherein in the Formula (I), $n$ is equal to 1, 2 or 3, Z represents an oxygen atom, the $(CH_2)_n$ group having a straight or branched chain, $R_1$ represents hydrogen, a lower alkyl or hydroxyalkyl radical containing 1 to 3 carbon atoms or a lower alkenyl or alkynyl radical containing 2 or 3 carbon atoms, $R_2$ represents a lower alkyl or hydroxyalkyl radical containing 1 to 3 carbon atoms or a lower alkenyl or alkynyl radical containing 2 or 3 carbon atoms, whereby $R_1$ and $R_2$ may be identical or different and may form together with the adjacent nitrogen atom a nitrogenous heterocyclic ring selected among the piperidino, pyrrolidino, morpholino and piperazino rings, A is a 2-pyridyl radical, an unsubstituted phenyl radical or a phenyl radical substituted by at least one substituent selected among the lower alkyl, lower alkoxy, hydroxy, trifluoromethyl, halo and nitro groups in the ortho, meta and/or para position, and B represents hydrogen, an alkoxy radical containing 1 to 3 carbon atoms or a group of the formula

in which $R_3$ and $R_4$ which may be identical or different, represent a lower alkyl or hydroxyalkyl group containing 1 to 3 carbon atoms, whereby $R_3$ may also represent hydrogen, as well as the pharmaceutically acceptable acid addition salts of said derivative of Formula (I).

11. A new derivative of 2-aminoindane according to claim 1, wherein in the Formula (I), $n$ is equal to 1, 2 or 3, Z represents an oxygen atom, the $(CH_2)_n$ group having a straight or branched chain, $R_1$ represents hydrogen, a lower alkyl or hydroxyalkyl radical containing 1 to 3 carbon atoms or a lower alkenyl or alkynyl radical containing 2 or 3 carbon atoms, $R_2$ represents a lower alkyl or hydroxyalkyl radical containing 1 to 3 carbon atoms or a lower alkenyl or alkynyl radical containing 2 or 3 carbon atoms, whereby $R_1$ and $R_2$ may be identical or different and may form together with the adjacent nitrogen atom a nitrogenous heterocyclic ring selected among the piperidino, pyrrolidono, morpholino and piperazino ring, A is a 2-pyridyl radical, an unsubstituted phenyl radical or a phenyl radical substituted by at least one substituent selected among the lower alkyl, lower alkoxy, hydroxy, trifluoromethyl, halo and nitro groups in the ortho, meta and/or para position and B represents hydrogen, as well as the pharmaceutically acceptable acid addition salts of said derivative.

12. A new derivative of 2-aminoindane according to claim 1, wherein in the Formula (I), $n$ is equal to 1, 2 or 3, Z represents two hydrogen atoms, the $(CH_2)_n$ group having a straight or branched chain, $R_1$ represents hydrogen, a lower alkyl or hydroxyalkyl or alkynyl radical containing 2 or 3 carbon atoms, $R_2$ represents a lower alkyl or hydroxyalkyl radical containing 1 to 3 carbon atoms or a lower alkenyl or alkynyl radical containing 2 to 3 carbon atoms, whereby $R_1$ and $R_2$ may be identical or different and may form together with the adjacent nitrogen atom a nitrogenous heterocyclic ring selected among the piperidino, pyrrolidino, morpholino and piperazino ring, A is a 2-pyridyl radical, an unsubstituted phenyl radical or a phenyl radical substituent by at least one substituent selected among the lower alkyl, lower alkoxy, hydroxy, trifluoromethyl, halo and nitro groups in the ortho, meta and/or para position and B represents an alkoxy radical containing 1 to 3 carbon atoms, as well as the pharmaceutically acceptable acid addition salts of said derivative.

* * * * *